(12) United States Patent
Wittig

(10) Patent No.: US 7,795,773 B1
(45) Date of Patent: Sep. 14, 2010

(54) ELECTRIC ACTUATOR

(75) Inventor: Michael Brian Wittig, Santa Clara, CA (US)

(73) Assignee: Michael Wittig, Santa Clara, CA (US)

( * ) Notice: Subject to any disclaimer, the term of this patent is extended or adjusted under 35 U.S.C. 154(b) by 0 days.

(21) Appl. No.: 11/175,470

(22) Filed: Jul. 5, 2005

Related U.S. Application Data

(60) Provisional application No. 60/622,667, filed on Oct. 26, 2004, provisional application No. 60/617,947, filed on Oct. 9, 2004, provisional application No. 60/585,286, filed on Jul. 2, 2004.

(51) Int. Cl.
*H02K 1/00* (2006.01)

(52) U.S. Cl. .................................. 310/179; 310/45

(58) Field of Classification Search ............ 310/43–45, 310/178–179
See application file for complete search history.

(56) References Cited

U.S. PATENT DOCUMENTS

| | | | | |
|---|---|---|---|---|
| 3,772,992 A * | 11/1973 | Moore et al. ................. 102/208 |
| 4,015,540 A * | 4/1977 | Roxberry ..................... 104/292 |
| 4,239,998 A * | 12/1980 | Hakamada et al. ............ 310/45 |
| 4,542,311 A * | 9/1985 | Newman et al. ............... 310/13 |
| 4,602,179 A * | 7/1986 | Kuznetsov et al. .......... 310/178 |
| 4,857,783 A * | 8/1989 | Prunkard ................... 310/68 B |
| 4,899,073 A * | 2/1990 | Takeuchi et al. ............ 310/116 |
| 4,933,581 A * | 6/1990 | Shramo ....................... 310/86 |
| 4,937,481 A * | 6/1990 | Vitale .......................... 310/15 |
| 5,124,607 A * | 6/1992 | Rieber et al. ................ 310/214 |
| 5,220,222 A * | 6/1993 | Shtipelman .................. 310/12 |
| 5,283,492 A * | 2/1994 | Mason ....................... 310/114 |
| 5,585,772 A * | 12/1996 | Joshi et al. .................. 335/215 |
| 5,969,589 A * | 10/1999 | Raj ............................. 335/277 |
| 5,982,072 A * | 11/1999 | Sung .......................... 310/239 |
| 6,213,737 B1 * | 4/2001 | Murakami et al. ........ 417/423.4 |
| 6,879,076 B2 * | 4/2005 | Long ..................... 310/156.38 |
| 2004/0012303 A1 * | 1/2004 | Bower et al. ........... 310/316.01 |

FOREIGN PATENT DOCUMENTS

JP 58083542 A * 5/1983

\* cited by examiner

*Primary Examiner*—Thanh Lam

(57) ABSTRACT

According to one embodiment, an electric actuator is provided comprising windings constructed from a conductive core of high magnetic permeability material surrounded by an electrical insulator. The conductive core simultaneously carries an electric current and a magnetic field, resulting in an actuator that can develop a high force or torque for its size compared to conventional electric actuators.

11 Claims, 41 Drawing Sheets

ELECTRIC ACTUATOR

CROSS-REFERENCE TO RELATED APPLICATIONS

This application claims priority from U.S. provisional application No. 60/585,286, filed on Jul. 2, 2004, U.S. provisional application No. 60/617,947, filed Oct. 9, 2004, and U.S. provisional application No. 60/622,667, filed on Oct. 26, 2004. This application incorporates the disclosures of all of the aforementioned applications by reference herein.

BACKGROUND

1) Field

These embodiments relate to electric actuators and more specifically to the construction of their current-carrying portions.

2) Discussion of Related Art

Electric actuators are often used in, for example, automobiles to actuate seats, mirrors, and windshield wipers. Electric motors, such as those found in the aforementioned automobile components, and voicecoil actuators, such as those found in speakers, are typical forms of an electric actuator. Other forms of electric actuators include linear motors, such as those used in the machine tool industry.

Disadvantageously, electric actuators usually require a form of transmission attached to their output to multiply the torque or force they produce in order to meet the force or torque requirements of the application. For example, a cordless drill is driven by a small DC (direct current) electric motor, a form of electric actuator, that is attached to a transmission typically comprised of multiple stages of gear reduction. A transmission typically trades speed for torque; that is, a motor producing motion at its output shaft that is high speed and low torque is fed into a transmission that results in motion that is at low speed and high torque at the output. There are many forms a transmission can take, from something as simple as a pivoting linkage that has a load attached at one point and the electric actuator at another, to a complex continuously variable transmission of the type that some automobiles are produced with today. Transmissions add sources of failure, increase the cost of the system, and reduce system efficiency. It is not uncommon, for example, to lose several percent of the power going through a transmission, primarily as a result of friction. Transmissions also typically add other unwanted problems. Gear transmissions usually add backlash, which is mechanical play between meshing gear teeth. When precision control of a system is attempted, such as in a robotic or machine tool application, this mechanical play can cause a great deal of problems. For such reasons, various attempts have been made to increase the force or torque for a given size of an electric actuator, especially electric motors (because these are the most common form of electric actuator). By increasing the torque of an electric motor, for example, a designer can use a smaller transmission ratio (the ratio of input motion to output motion) or no transmission at all. A smaller required transmission ratio typically results in a smaller, cheaper transmission that has lower backlash, and having no transmission at all is even better. Therefore, it is a primary objective of electric actuator designers to increase torque for a given motor size. For example, U.S. Pat. No. 6,864,613 to Graham, et al. shows windings of an electric motor with a higher conductor packing density than is typical, but the gains in torque for a given size of windings and input current are modest because the gain in actual copper to the windings through the reduction of insulation is small. U.S. Pat. No. 5,396,140 to Goldie, et al. and patent application Ser. No. 09/770,939 to Wittig both show motors that have multiple sets of windings sharing a single magnetic return path, which may increase the torque over a motor with a single set of windings by the number of rotors present. Again, the torque gains for such a design for a given motor size may not be significantly increased.

It is therefore an objective of the present embodiments to present an electric actuator that may have significantly increased force or torque for a given actuator size.

SUMMARY

According to one embodiment, an electric actuator is provided comprising windings constructed from a conductive core of high magnetic permeability material surrounded by an electrical insulator. The conductive core simultaneously carries an electric current and a magnetic field, resulting in an actuator that may develop a high force or torque for its size compared to conventional electric actuators.

BRIEF DESCRIPTION OF THE DRAWINGS

The embodiments are further described by way of example with reference to the accompanying drawings wherein.

DETAILED DESCRIPTION OF THE EMBODIMENTS

Figure 1:
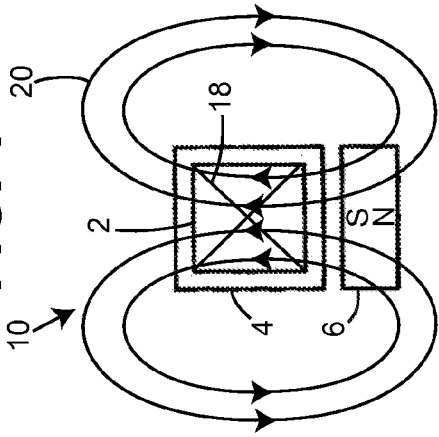
FIG. 1 is a cross-sectional view of an electric actuator according to one embodiment.
Figure 2:
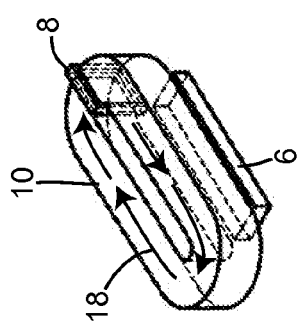
FIG. 2 is an isometric view of the electric actuator of FIG. 1.

FIG. 1 of the accompanying drawings illustrates an electric actuator according to one embodiment. A wire 10 is comprised of electrical insulation 4 of at least 1 ohm-m of resistance and at least 50 volts/0.001 inch dielectric strength, preferably lacquer of the type used to insulate magnet wire, covering a conductive high permeability core 2 that is carrying a current 18. Conductive high permeability core 2 is composed of a material with a high magnetic permeability, high magnetic saturation flux density, and a high electrical conductivity. Preferably, the material of conductive high permeability core 2 has an electrical resistance of less than $4 \times 10^{-7}$ ohm-m, a magnetic permeability relative to air of at least 100, and a magnetic saturation flux density of at least 1 Tesla. An exemplary material is purified iron (Fe) of at least 99.98% purity. Electric current 18 is represented by an 'X' because this is the typical notation used to represent current flowing into the page (an 'O' is used to represent current flowing out of the page, as in FIG. 5). A permanent magnet 6 produces magnetic field lines 20, which run from the south pole of permanent magnet 6 to the north pole of permanent magnet 6. An electromagnet could be substituted for the permanent magnet, but a permanent magnet is preferable because it doesn't require any power (a superconducting electromagnet could be used, but these may be prohibitively expensive and may require supercooling at the present time). A force is exerted on wire 10 as a result of the crossing of magnetic field lines 20 with electric current 18. The force attempts to push wire 10 to the right, which means that there is a reaction force trying to push magnet 10 to the left. Therefore, we could fix wire 10 and have permanent magnet 6 move to the left, or fix permanent magnet 6 and have wire 10 move to the right. FIG. 2 shows the components of FIG. 1 in an isometric view, revealing that electric current 18 flows in a loop; it also shows power source 8, which creates electric current 18. Power source 8 is preferably a battery.

Figure 3:
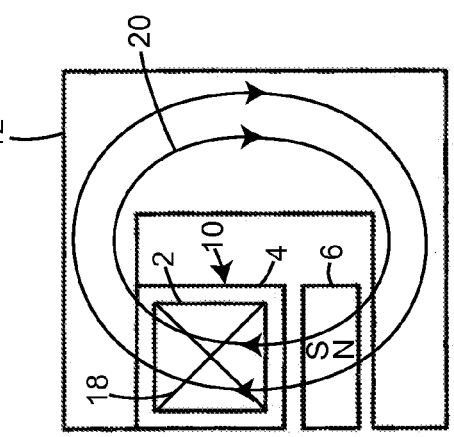
FIG. 3 is a cross-sectional view of an electric actuator having a return path according to one embodiment.
Figure 4:
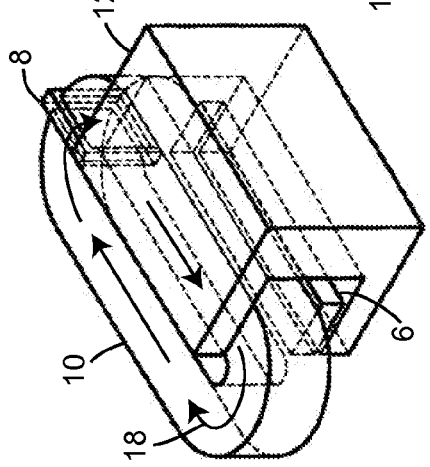
FIG. 4 is an isometric view of the electric actuator of FIG. 3.

FIG. 3 shows an electric actuator according to another embodiment. Components shown in this figure with numbering identical to that of FIG. 1 have the same functionality and are composed of the same materials as those in FIG. 1. A magnetic return 12 has been added. The magnetic field from permanent magnet 6 is now generally confined to traveling along a magnetic return 12, because it is composed of a material with a high magnetic permeability, high magnetic saturation flux density. Magnetic return 12 is preferably of a material with a high magnetic saturation flux density and high magnetic permeability. An exemplary material is cobalt-iron (CoFe) alloy of 17% cobalt. Advantageously, magnetic field lines 20 travel easily through conductive high permeability core 2, and electric current 18 also flows relatively easily through it while being insulated and prevented from electrically arcing by electrical insulation 4. This would not be the case if wire 10 had a high electrical conductivity material with a low magnetic permeability and low magnetic saturation flux density was used for core 2 instead, such as the materials most commonly used in the art (copper and aluminum) for the core of the wires of windings. The force exerted on wire 10 as a result of the crossing of magnetic field lines 20 with electric current 18 depends on both magnetic field and electrical current, however. We would expect that if core 2 would be composed out of copper, for example, core 2 would have a lower electrical resistance (for a given thickness) than if core 2 was composed of 99.98% pure iron, for example, resulting in a higher current that would offset the gain in magnetic field strength.

Figure 5:
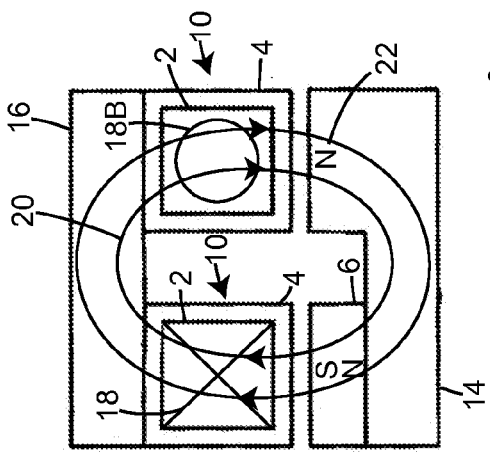
FIG. 5 is a cross-sectional view of an electric actuator having a return path and a current loop in a winding that intersects with the magnetic field loop in two places according to one embodiment.
Figure 6:
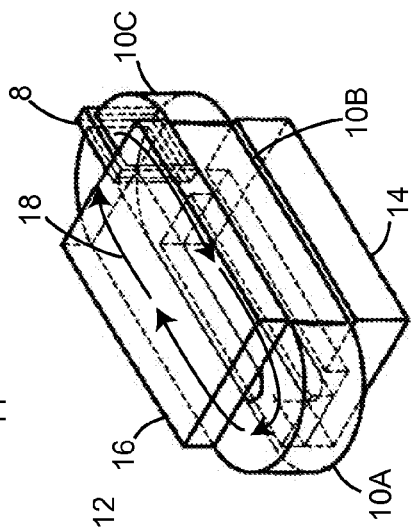
FIG. 6 is an isometric view of the electric actuator of FIG. 5.

FIG. 5 shows an embodiment where electric current 18 traveling in wire 10 crosses magnetic field lines 20 twice. Components shown in this figure with numbering identical to that of FIG. 3 have the same functionality and are composed of the same materials as those in FIG. 3. Magnetic return 12 is replaced with an outer magnetic return 16 and an inner magnetic return 14 to allow wire 10 to be oriented as shown. An important difference exists between the actuator shown in FIG. 5 and the one shown in FIG. 3: Wire 10, with core 2 and electrical insulation 4, must be partitioned into 3 sections: 10a, 10b, and 10c. End sections 10a and 10b, each shaped like a half of a donut, must be made using a material for core 2 that has a very low magnetic permeability to prevent magnetic field lines 20 from traveling parallel to electric current 18 along high permeability conductor 2 from, for example, the S (south) pole of permanent magnet 6 to the N (north) pole 22 of inner return 14, effectively short-circuiting the magnetic circuit. Therefore, end sections 10a and 10b are constructed from a low magnetic permeability material with preferably a high electrical conductivity to aid in carrying electric current 18 with minimal losses. An exemplary material is copper. Advantageously, the electric actuator of FIG. 5 produces approximately twice the force for a given electric current 18 and a given magnetic flux of magnetic field lines 20, because electric current 18 interacts with magnetic field lines 20 twice and both interactions produce force in the same direction.

Figure 7:
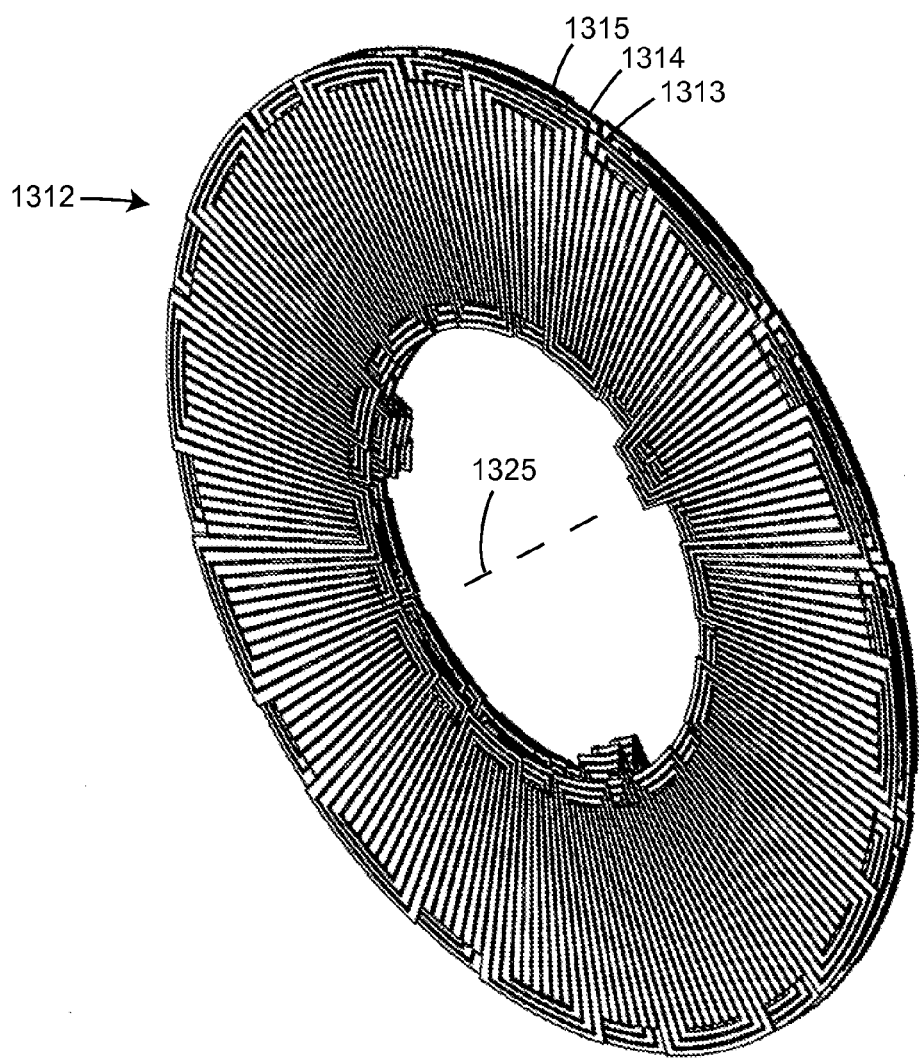
FIG. 7 is a perspective view of an embodiment for an electric actuator, specifically a disk-shaped electric motor.

FIG. 7 of the accompanying drawings shows another embodiment, a 24 pole, 3 phase winding of a motor that carries electric current in order to produce a torque about axis 1325. A motor winding 1312 consists of 3 layers of 3 phase windings 1313, 1314, and 1315 (3 layers are shown for clarity, although preferably the motor uses many layers, such as 15, of 3 phase windings, since the magnetic field does not decrease appreciably with the gap between poles in this design). 3 phase winding 1313 is a preferably a wave-type motor winding, as shown, although other types of winding patterns, such as a lap type winding, as well as different numbers of poles or phases, are also possible.

Figure 8:
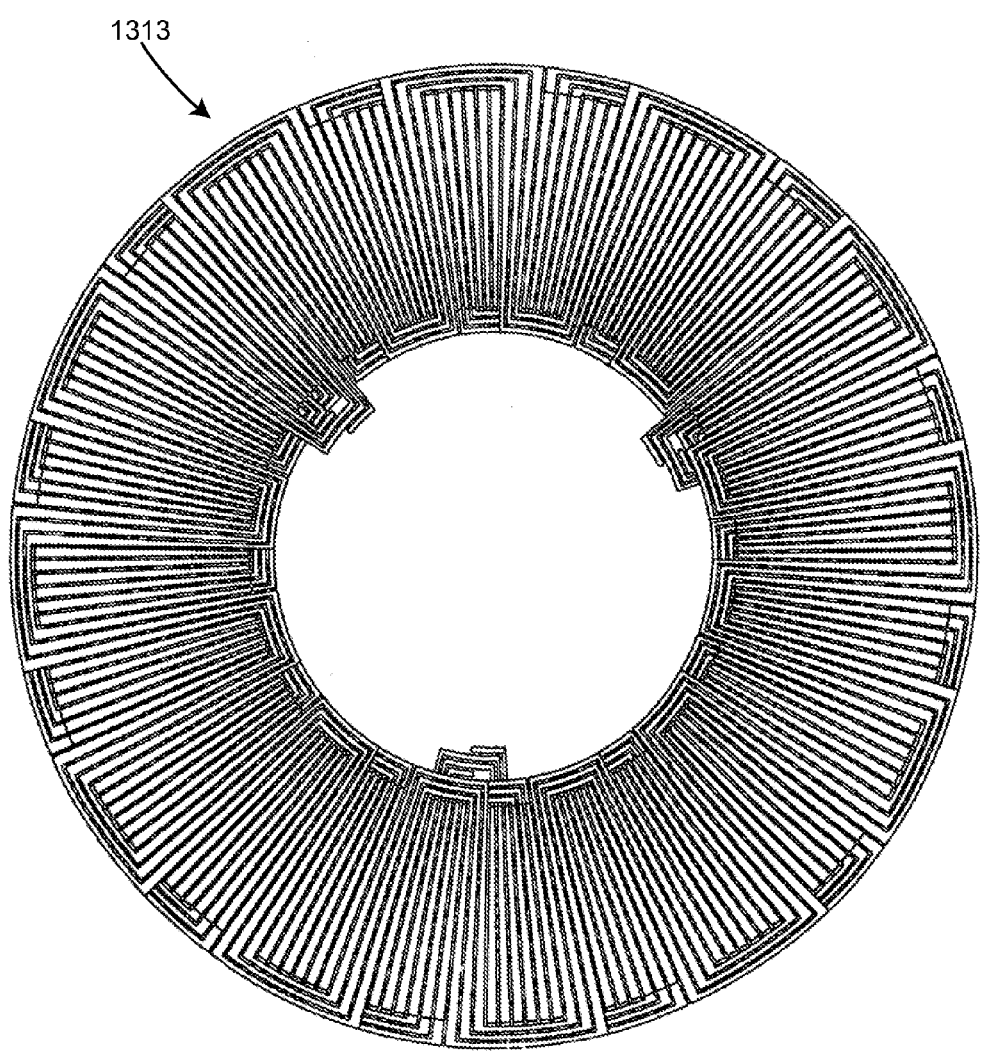
FIG. 8 is a front view of the embodiment shown in FIG. 7.
Figure 9:
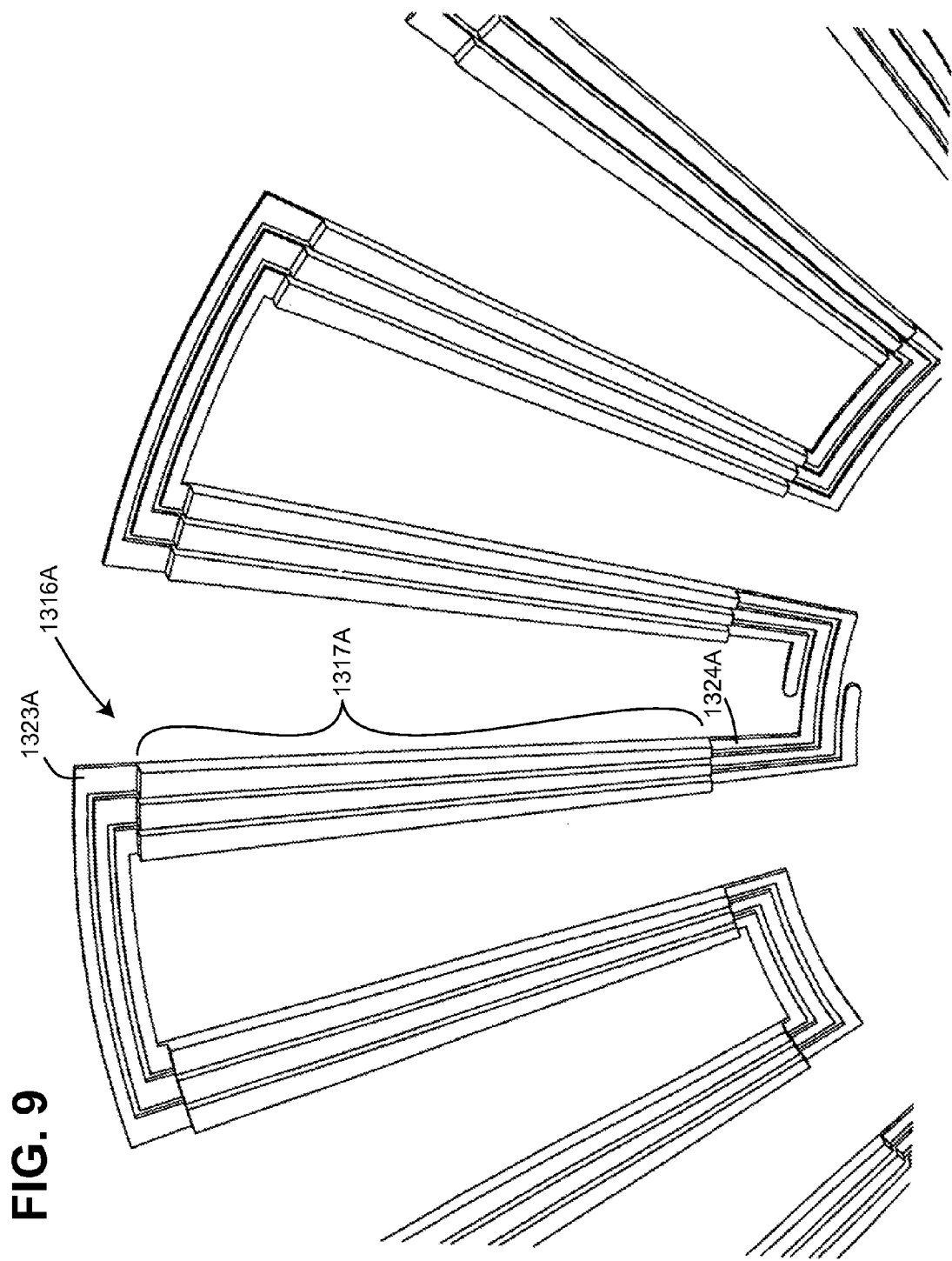
FIG. 9 is a close-up perspective view of one phase of a winding from the embodiment shown in FIG. 7.
Figure 10:
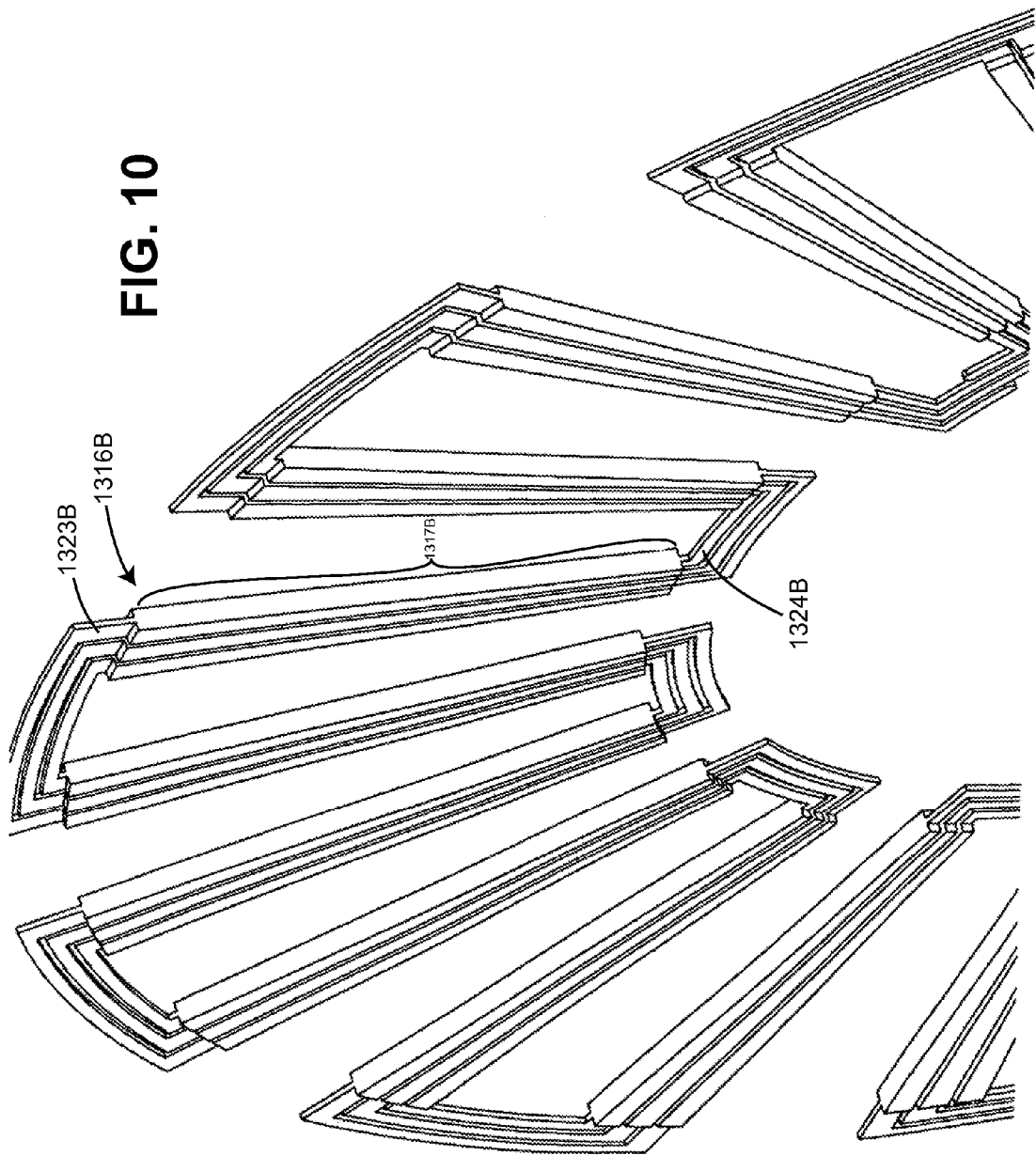
FIG. 10 is a second close-up perspective view of one phase of a winding from the embodiment shown in FIG. 7.

FIG. 8 shows 3 phase winding 1313, which is further comprised of two pieces of a single phase 1316a, as shown in FIG. 9, and one piece of a single phase 1316b, as shown in FIG. 10. A thick section 1317 of single phase 1316a is composed of a material with a high magnetic permeability, high magnetic saturation flux density, and high electrical conductivity, preferably purified iron, while the remainder of single phase 1316a is comprised of a material with a low magnetic permeability and high electrical conductivity, preferably copper. For example, the thick section is approximately 0.1 inches thick, while the remainder of 1316a is 0.025 inches thick. Advantageously, the thick section's larger cross-sectional area offsets a higher resistivity in the high permeability material, such as in the case of iron. The two materials are fused to form a good electrical joint, preferably by electron beam welding, or alternatively by soldering them together.

Figure 11:
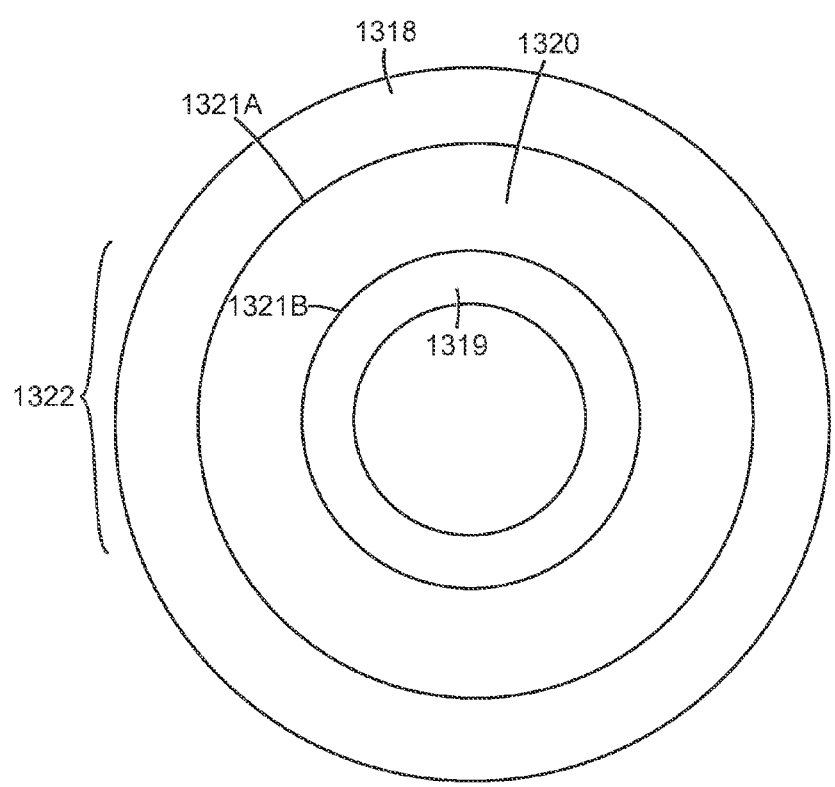
FIG. 11 shows a front view diagram of the different regions of a winding for the embodiment shown in FIG. 7.
Figure 12:
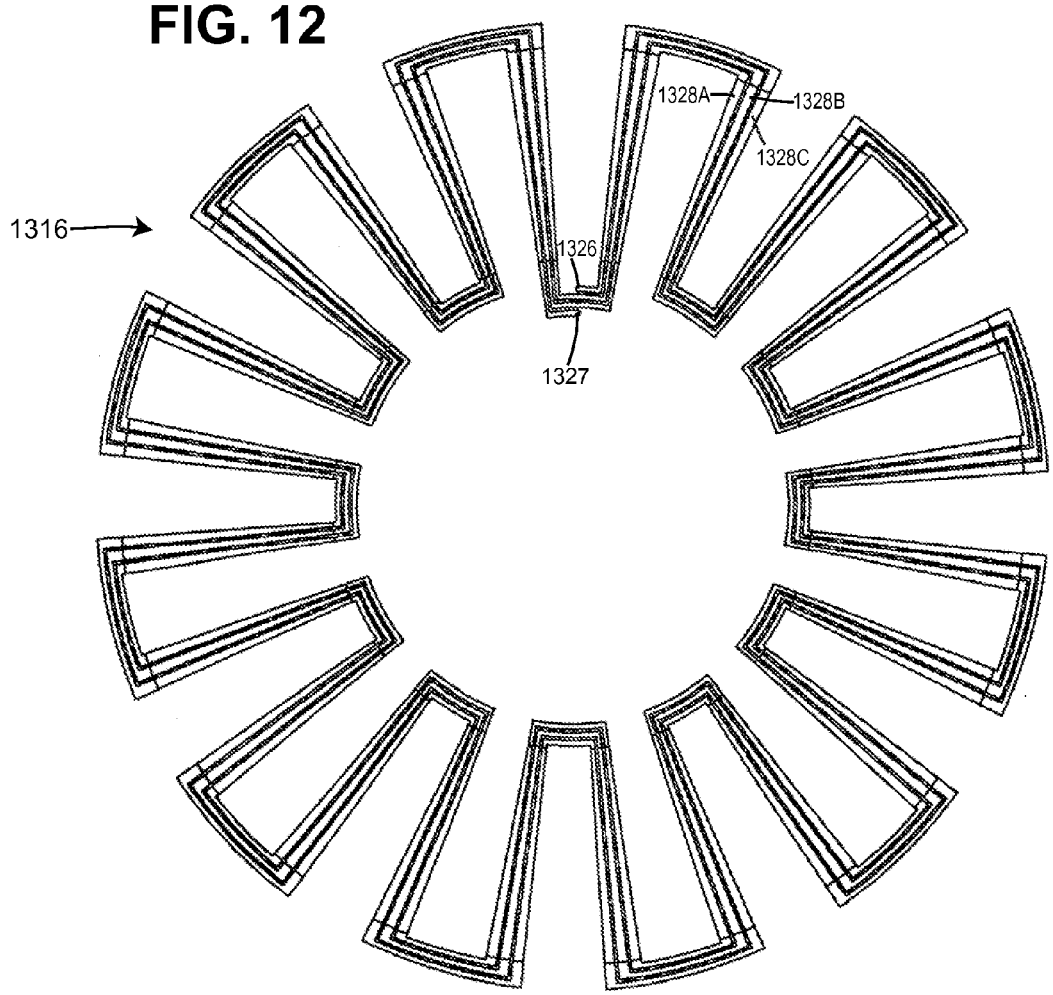
FIG. 12 shows a front view of one phase of a winding from the embodiment shown in FIG. 7.
Figure 13:
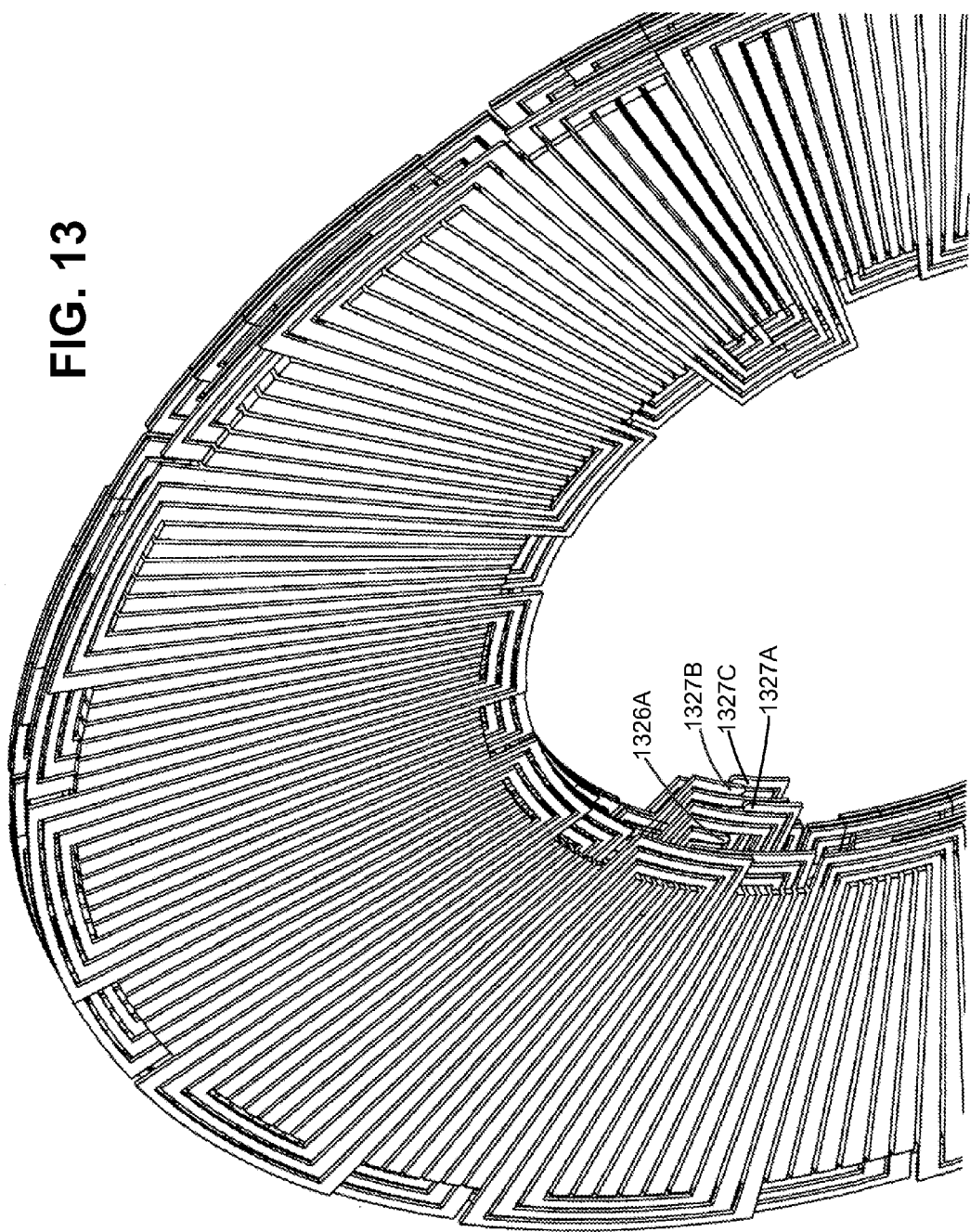
FIG. 13 shows a perspective view of multiple layers of 3 phase windings of the embodiment shown in FIG. 7.
Figure 14:
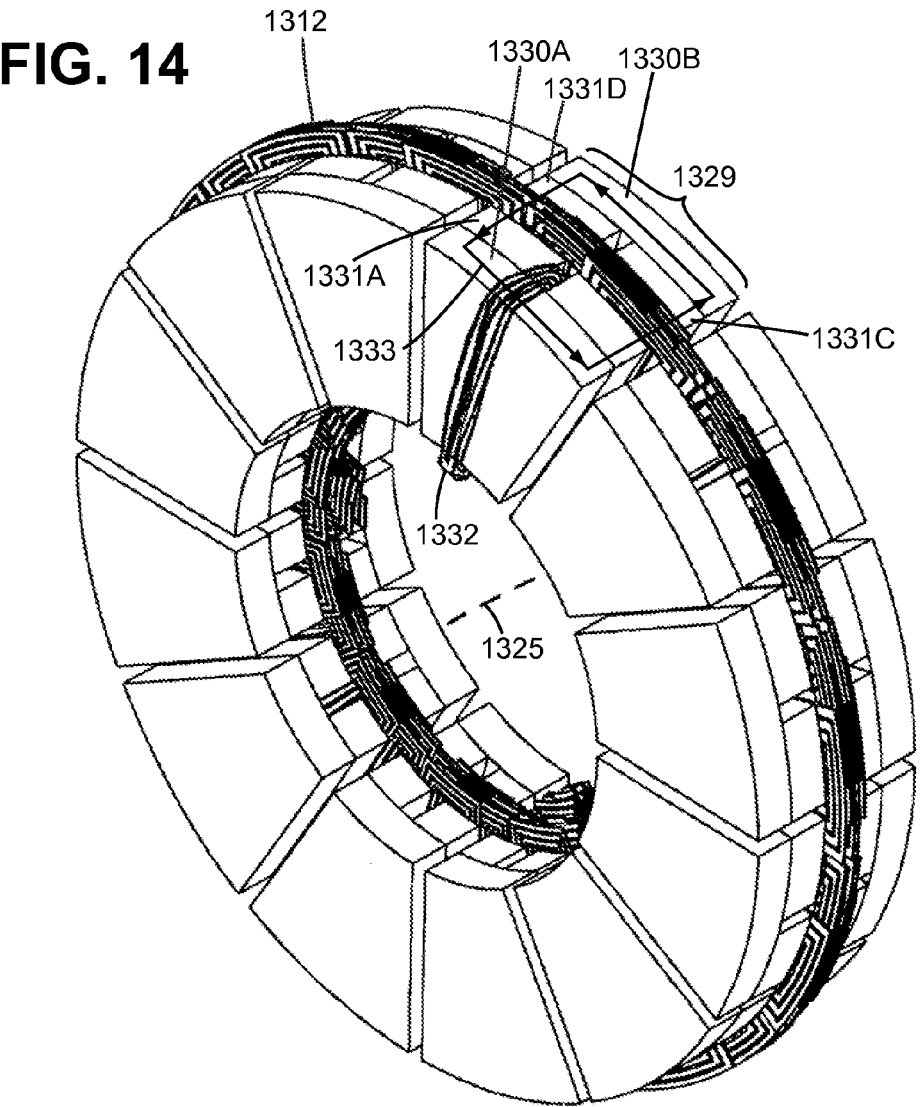
FIG. 14 shows a perspective view of multiple layers of 3 phase windings with pole faces and return paths of the embodiment shown in FIG. 7.
Figure 18:
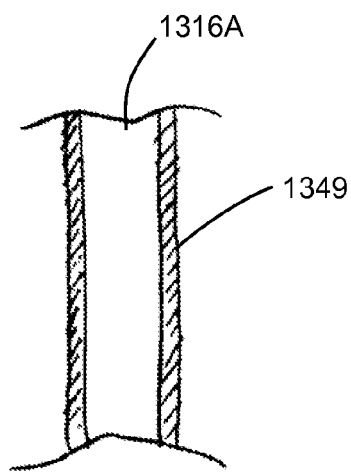
FIG. 18 shows a cross-sectional view of an insulated winding conductor.

Preferably, as shown in FIG. 11, a copper ring 1318 is placed around a thicker purified iron ring 1320, which is itself placed around a thinner copper ring 1319 of the same thickness as copper ring 1318. Electron beam welding is performed along where the rings meet at interfaces 1321a and 1321b. Ring assembly 1322 is then cut into the shape of the two single phases 1316a or 1316b, as shown in FIG. 12, preferably by waterjet cutting, but alternatively by laser cutting or stamping. The difference between single phases 1316a and 1316b can be seen by comparing FIG. 9 and FIG. 10; it is clear that an upper portion 1323a and a lower portion 1324a both join thick section 1317 so as to share a face, while an upper portion 1323b and a lower portion 1324b both join a thick section 1317b midway along the thickness of 1317b. This is accomplished by positioning copper rings 1318 and 1319 differently relative to purified iron ring 1320 during the electron beam welding process (for example, a spacer is placed under the copper plates when single phase 1316b is made). Each single phase, for instance 1316a, is laminated after being cut out with a very thin (on the order of 0.0003 of an inch, or less, but sufficient to provide electrical isolation between layers at the voltage the motor windings are operated at) layer of electrical insulator 1349 (as is well known in the prior art of transformer and motor laminations) as shown in FIG. 18. Preferably, layer 1349 is a high magnetic permeability material with a relatively high electrical resistance, such as for example a ferrite or a "ferri"-magnetic material. By having two different versions of single phase winding 1316, two pieces of single phase 1316a and 1 piece of single phase 1316b may be joined to form 3 phase winding 1313, as follows: 1 piece of single phase 1316a is flipped over, a piece of single phase 1316b is layered over it, and another piece of single phase 1316a is placed on top of it. This is the preferred method of fabricating 3 phase winding 1313, although it is also possible to construct it of 3 pieces of single phase 1316a by first embossing the piece that replaces 1316b so as to bend upper portion 1323a to resemble upper portion 1323b and lower portion 1324a to resemble lower portion 1324b. In either construction method, it is critical that the top and bottom surfaces of all thick sections 1317 of a 3 phase winding 1313 are co-planar once 3 phase winding 1313 is completed, so that it can be layered multiple times, with each layer parallel to the next and perpendicular to an axis 1325, as is shown in FIG. 7. 3 phase windings 1313, 1314, and 1315 are identical, except that the middle layer, 3 phase winding 1314, is flipped over. This is necessary to ensure that the direction current is flowing in one layer matches the direction current is flowing in the next layer, and so on. Single phase 1316, as shown in FIG. 12, has two ends, 1326 and 1327. As shown in FIG. 13, 1327a of 3 phase winding 1313 connects to 1327b of 3 phase winding 1314, while (not shown) 1326b of 3 phase winding 1314 connects to 1326c of 3 phase winding 1315. Preferably, these connections are formed by spot welding, or alternatively by soldering (of course, the insulation in the area of connection is either removed or never applied during the construction process, as through masking, to allow electricity to flow at these connection points). One conductor is formed which extends from 1326a of 3 phase winding 1313 to 1327c of 3 phase winding 1315. This creates, in effect, 9 turns of wire per phase, since single phase 1316, as shown in FIG. 12, has 3 turns 1328a, b, and c, and there are 3 layers of 3 phase windings. Notably, this method of construction utilizes the iron as both an electrical conductor and a carrier of magnetic field lines, whereas in a standard motor, iron (or silicon steel as is more commonly used) conducts just the magnetic field while separate copper conducts just the electrical current. This dual-use of a substantial portion of the material in the motor results in a more power-dense motor, besides the advantage of being able to substantially grow the gap between poles without appreciable magnetic field strength loss.

Figure 15:
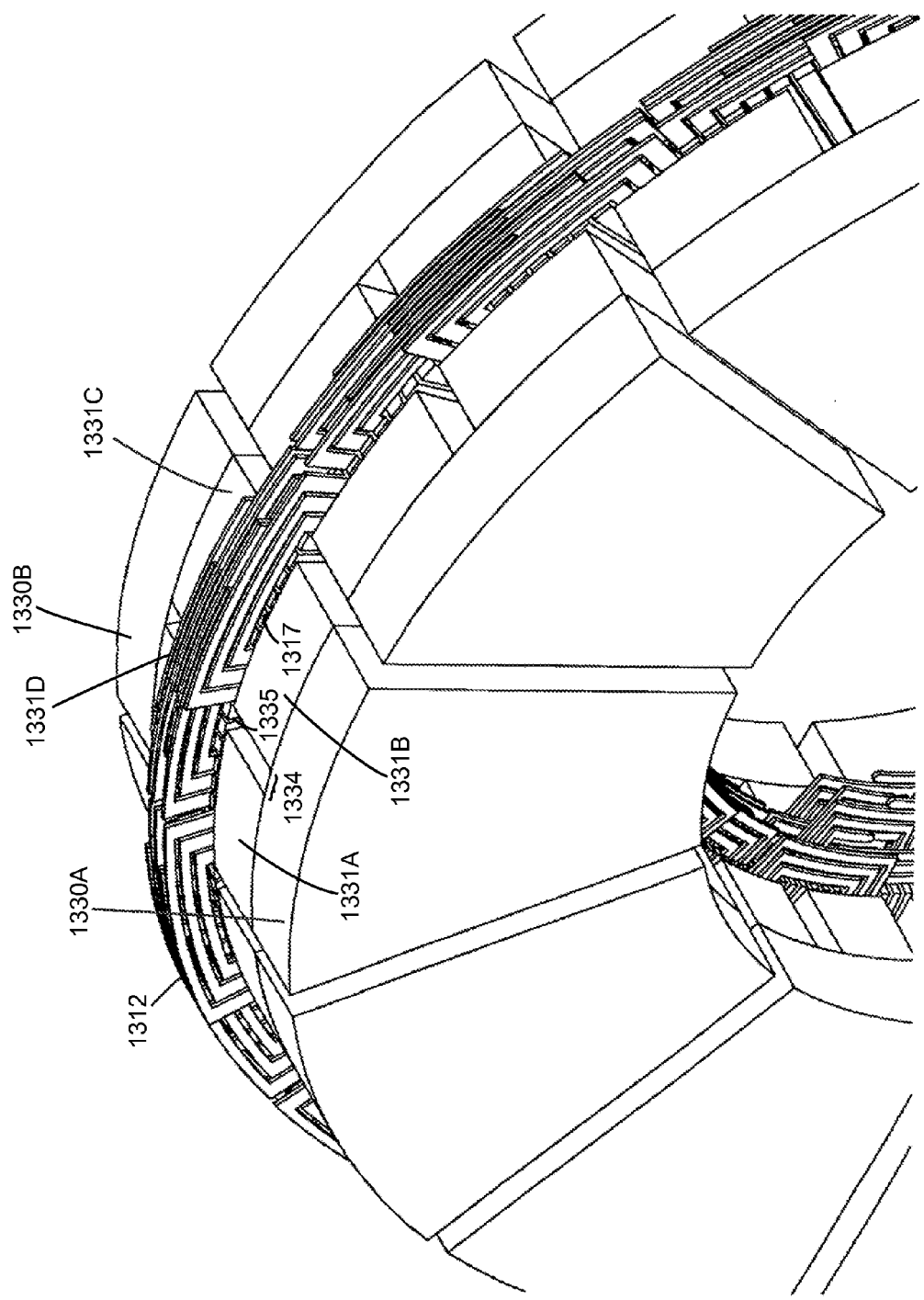
FIG. 15 shows a close-up perspective view of multiple layers of 3 phase windings with pole faces and return paths of the embodiment shown in FIG. 7.
Figure 16:
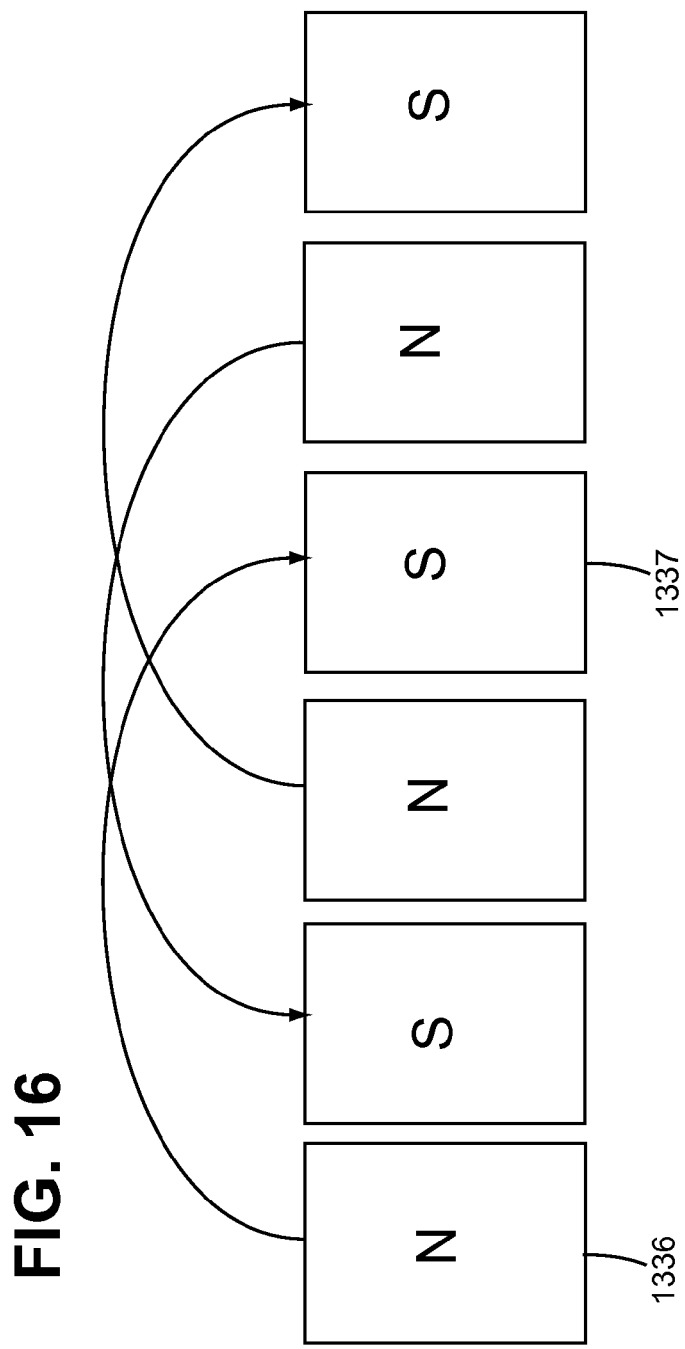
FIG. 16 shows a diagram of how flux can be routed to non-adjacent poles.
Figure 19:
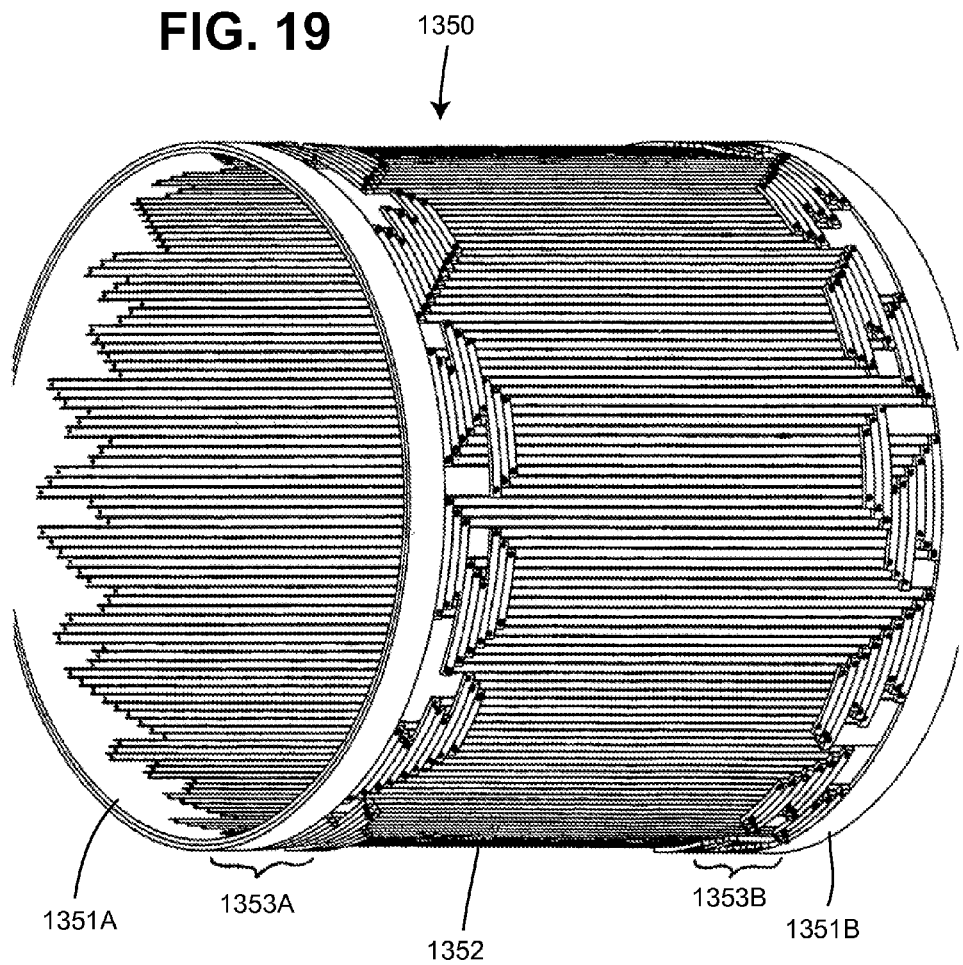
FIG. 19 shows a perspective view of another embodiment designed for another form of electric actuator, a cylindrical electric motor.

FIG. 19 shows motor winding 1312 assembled into a set of alternating north/south poles arrayed around axis 1325 on both sides of motor winding 1312. Each return loop set 1329 consists of poles 1331a through 1331d and pole connectors 1330a and 1330b. Pole connectors 1330a and 1330b are preferably each wrapped with a field winding 1332 (although this is only drawn once in the figure for clarity). Both the poles and pole connectors are preferably made of a material with a high magnetic permeability and high magnetic saturation flux density. Field winding 1332 consists of multiple turns of insulated, preferably copper, wire. Alternatively, only pole connector 1330a or 1330b could be wrapped with wire (it is not necessary to wrap both to establish the magnetic field, although wrapping both allows more total turns per return loop set 1329). Magnetic field line 1333 shows the path the magnetic field lines take, traveling perpendicular to motor winding 1312. As shown in FIG. 15, gap 1334 is necessary between poles 1331a and 1331b to prevent the magnetic field from substantially returning without traveling through motor winding 1312. Furthermore, the high permeability of thick section 1317 encourages the magnetic field to take the path through motor winding 1312, despite the relatively large gap between poles 1331*b* and 1331*c*. Additionally, gap 1335 between adjacent thick sections 1317 discourages the magnetic field from traveling across adjacent thick sections 1317 within motor winding 1312 to complete the magnetic return path. Alternatively, the magnetic fields can be returned between poles as schematically shown in FIG. 16, whereas the field from north magnetic pole 1336 is returned to a south magnetic pole 1337, 3 poles down instead of adjacent, so as to substantially increase the number of gaps 1335 between poles (thereby substantially discouraging the magnetic field from returning across motor winding 1312) and also effectively increasing gap 1334 (thereby substantially discouraging the magnetic field from returning prematurely, before going through all layers of motor winding 1312 with approximately the same flux).

Figure 17:
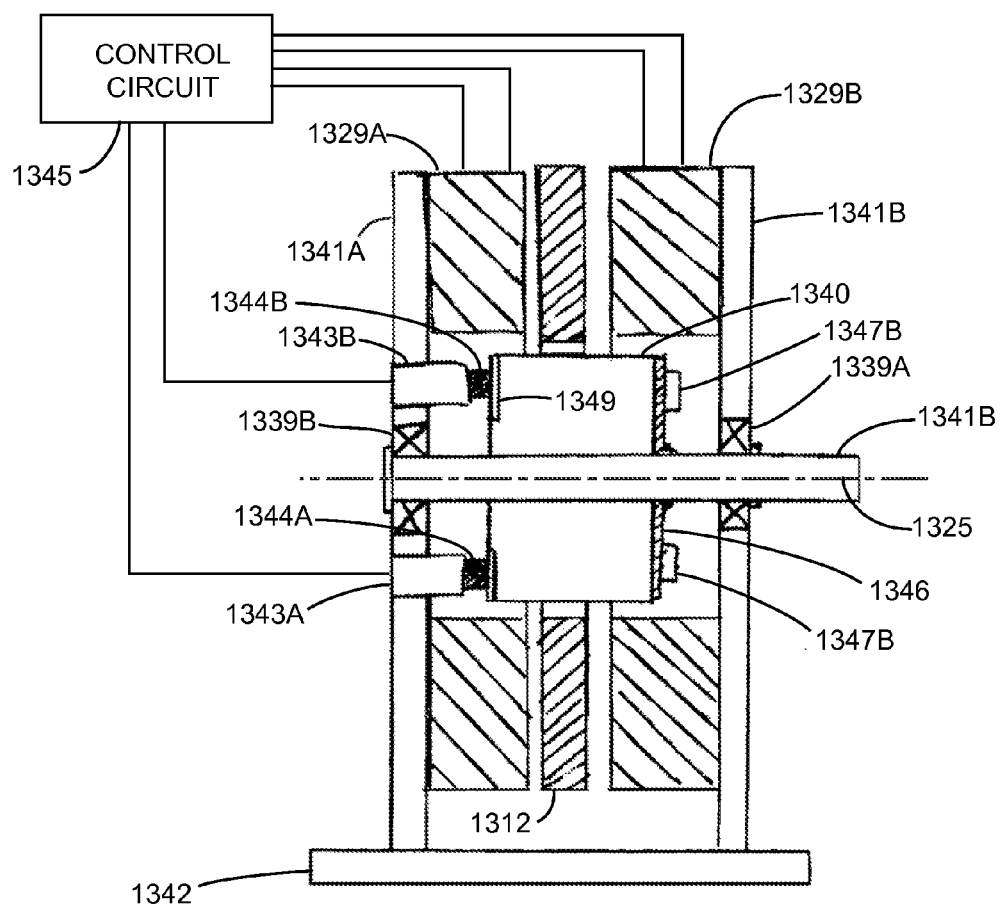
FIG. 17 shows a cross-sectional view of a brushed motor employing windings.

FIG. 17 shows a cross-sectional view of a motor comprising motor winding 1312 assembled between an array of return loop sets 1329 around axis 1325 with other details shown. Motor winding 1312 is encapsulated in epoxy and attached to a shaft adapter 1340, which has a shaft 1338 passing through it. A shaft adapter plate 1346 is welded to shaft 1338 by a weld bead 1348. Shaft adapter plate 1346 has holes about axis 1325 through which screws 1347*a* and 1347*b* attach it rigidly to shaft adapter 1340. Torque from motor winding 1312 is transferred to shaft adapter 1340, then to shaft adapter plate 1346, then to shaft 1338, which is the output of the motor. Brushes 1344*a* and 1344*b* ride in brush holders 1343*a* and 1343 *b*and conduct electrical power to a motor commutator 1349, which in turn conducts electrical power to motor winding 1312. Alternatively, the motor can be constructed as a brushless motor, as is well known in the prior art, although a brushed motor is preferred for overall system cost savings (the electronics of a brushless controller are typically more expensive at the present time). A control circuit 1345 is connected to brushes 1344*a* and 1344*b*, and also to field windings 1332 of return loop sets 1329. The control circuit can alter power to both motor winding 1312 and field windings 1332 (by controlling the voltage or limiting the current to both of these). This allows the controller to set the trade-off between motor torque and speed: normally, for maximum torque, the field windings 1332 are energized at full power to develop the strongest magnetic field across the poles of the motor, for example between 1331*b* and 1331*c*. This creates the most torque in the motor, as each energized radial conductor in motor winding 1312 in between the poles has a tangential force created that is proportional to the field generated in the return loop sets 1329 and across motor winding 1312. Since control circuit 1345 can decrease the magnetic field across the poles of the motor, the torque can be decreased and traded for rotational speed instead. By controlling the power sent to motor winding 1312 via the brushes, control circuit 1345 also controls the power output of the motor (but the power output is of course also dependent on the load on the shaft 1338).

Figure 20:
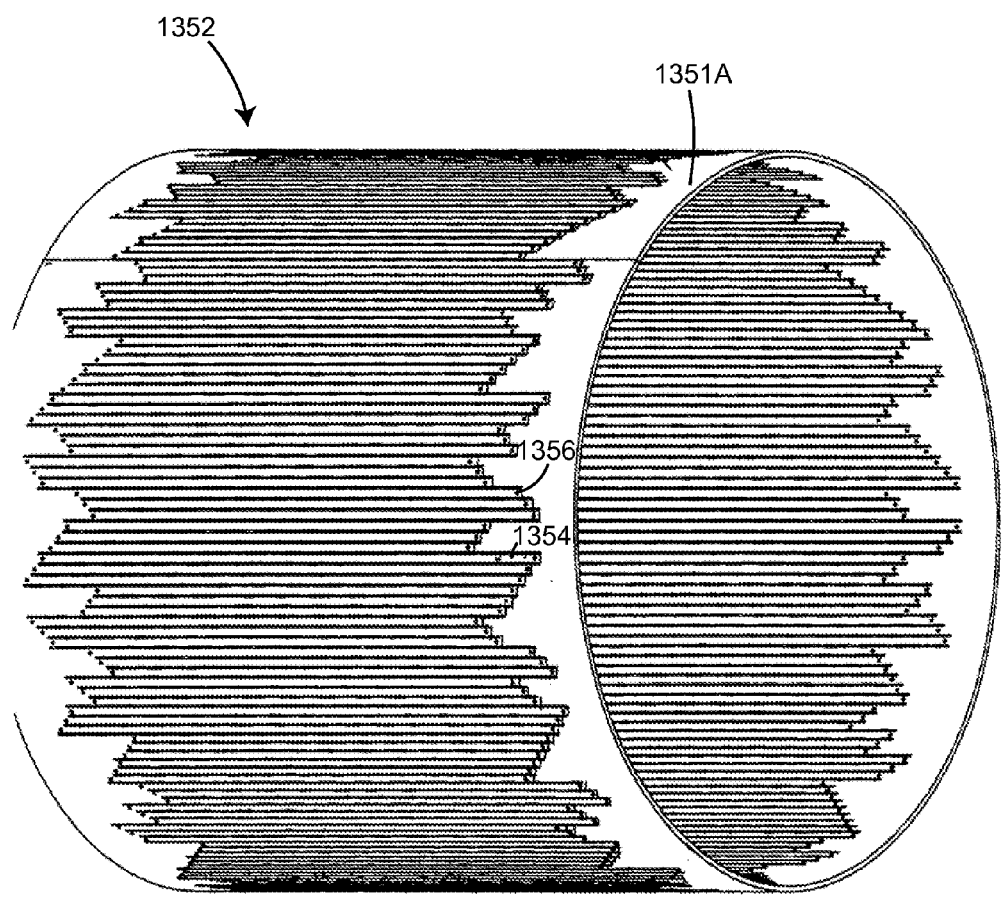
FIG. 20 shows a perspective view of a tubular component of the windings of the electric actuator of FIG. 19.
Figure 21:
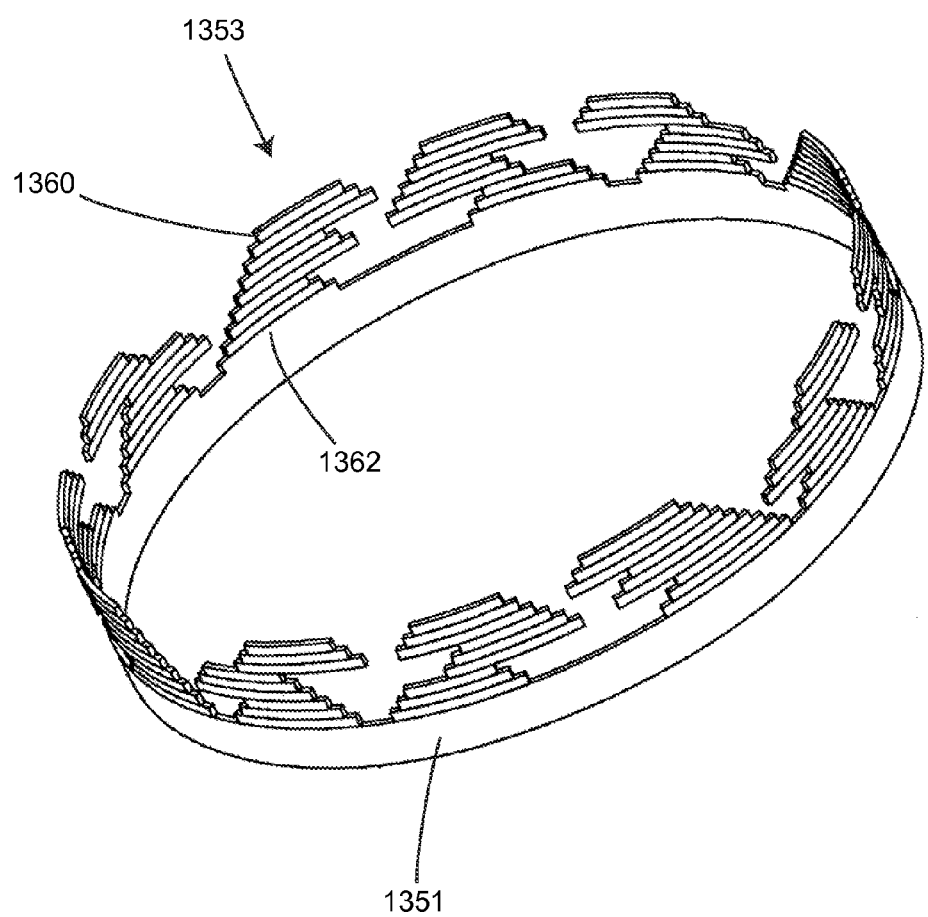
FIG. 21 shows a perspective view of electrically conductive connectors of the windings of the electric actuator of FIG. 327 which connect the strips of the component shown in FIG. 20 before being cut apart.

FIG. 19 shows another embodiment, an armature for a cylindrical electric motor. An armature 1350 is shown assembled with turn support ends 1351*a* and 1351*b* still attached. Armature 1350 includes a tube 1352, preferably made of purified iron, that is cut using a laser tube cutter so as to resemble the form shown in FIG. 20. Tube 1352 includes slits 1354 and holes 1356. A connector strip piece 1353 is preferably made of copper and assembled to and aligned with tube 1352, as shown in FIG. 19, and consists of connector strips 1360 connected to each other and to turn support end 1351 (temporarily, for assembly purposes). Each line 1362 represents a cut that will be made later once connector strip piece 1353 is assembled and connected to tube 1352. Connector strip piece 1353 includes holes 1358 (as shown in FIG. 19) that correspond to holes 1356 on tube 1352. To better explain the construction of armature 1350 of FIG. 19, it is shown rolled flat in FIG. 22. Phases 1364*a, b*, and *c* correspond to the standard 3 phase design often used in the motor industry. Each phase is shown with 3 turns, and each phase has 2 ends. For example, phase 1364*a* is an insulated conductor path that has two ends, end 1368 and end 1370. Phase 1364*a* is shown in detail in FIG. 23, showing the 3 turns of phase 1364*a* and ends 1368 and 1370. Example magnetic poles of a motor using the armature are shown separated by lines 1372—in this case, the armature is built for 24 alternating north and south poles. The preferred order of constructing armature 1350 is as follows:

1) Purified iron tube 1352 is laser cut as shown in FIG. 20.

2) Two copper connector strip pieces 1353*a* and 1353*b* are laser cut from thin-walled tubing.

3) The purified iron tube 1352 and copper connector strip pieces 1353*a* and 1353*b* are each coated with a thin layer of electrical insulation, preferably a ceramic with a high magnetic permeability and very high electrical resistivity.

Figure 22:
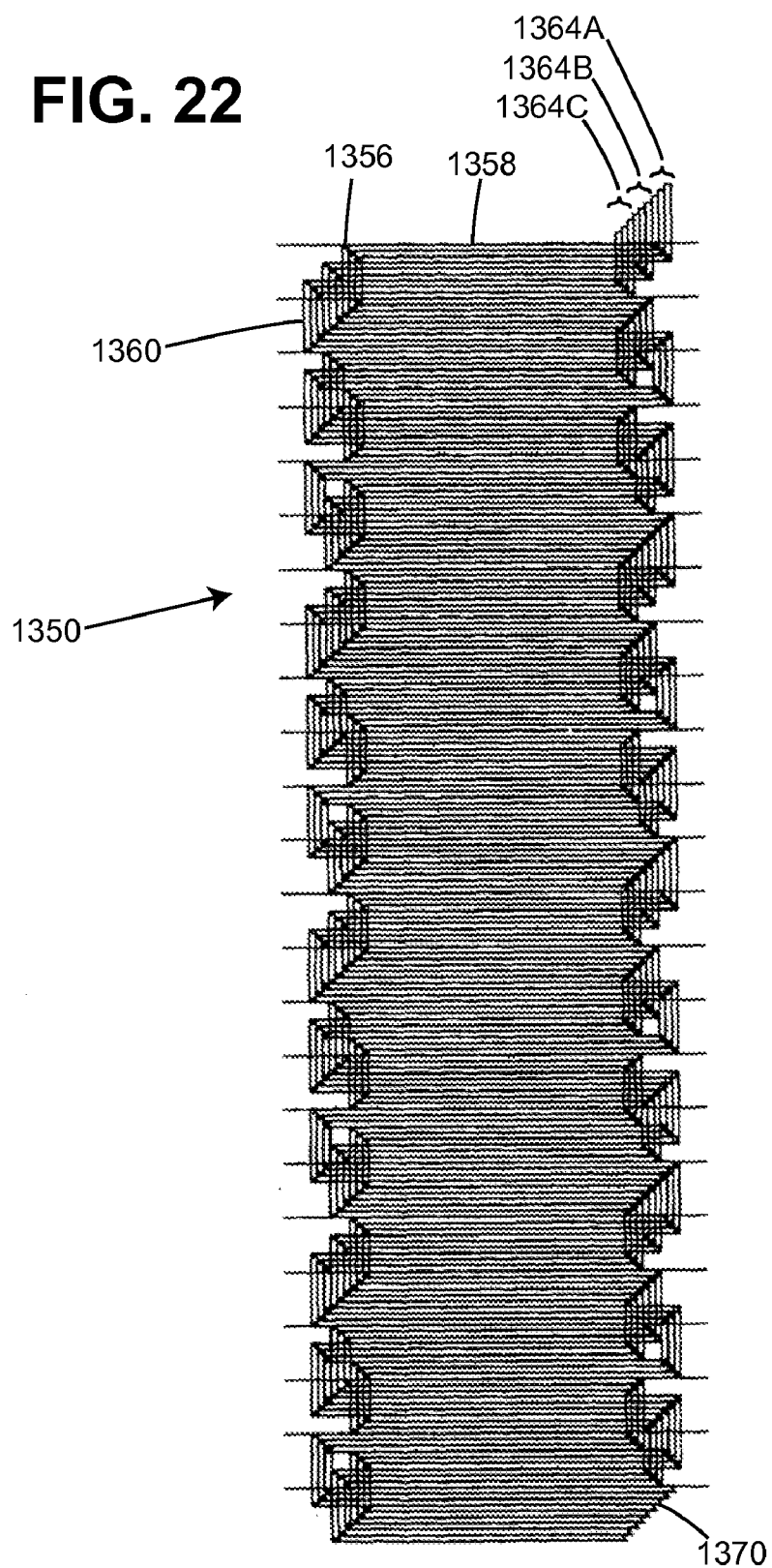
FIG. 22 shows an unrolled strip of conductors.
Figure 23:
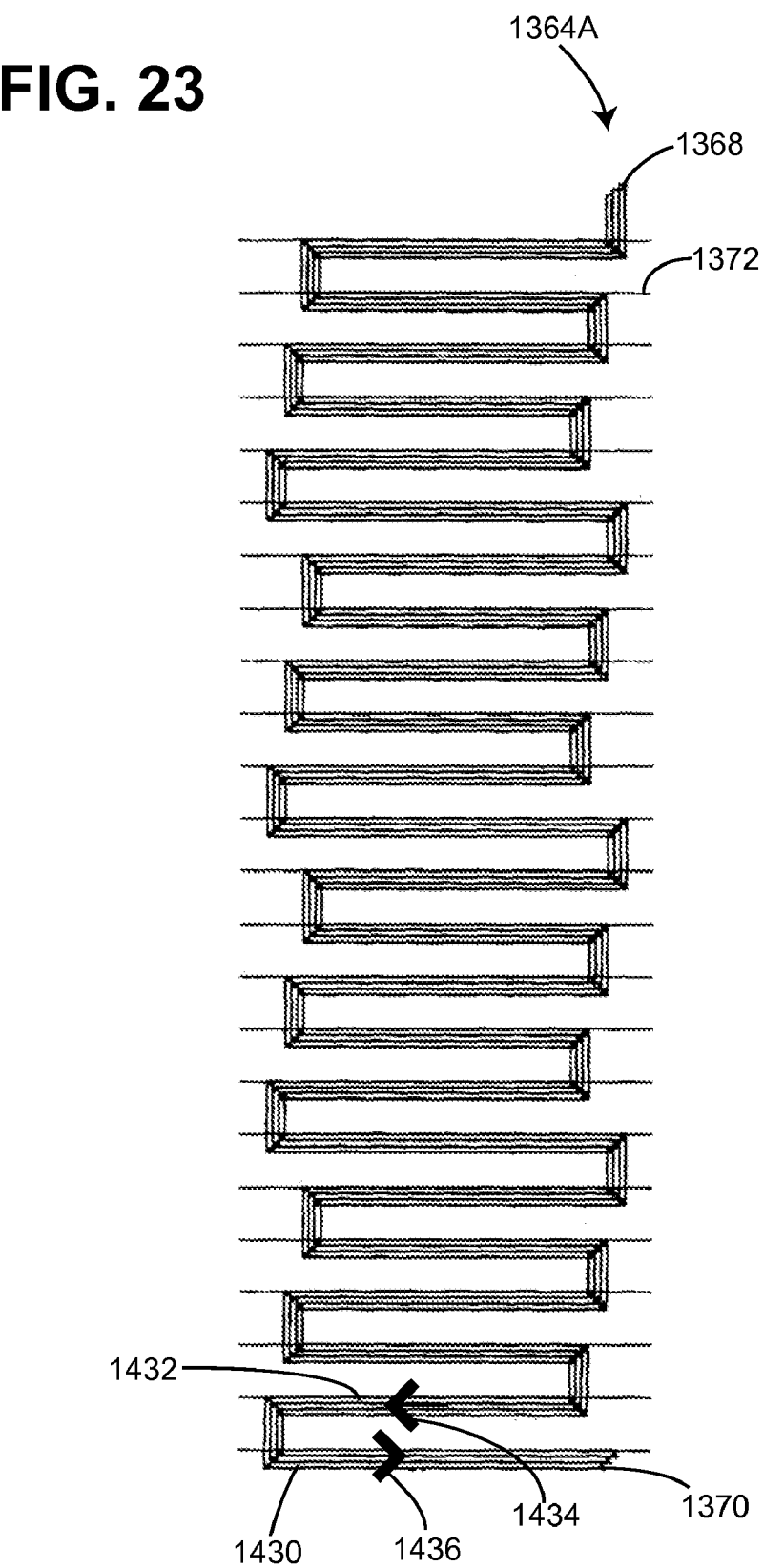
FIG. 23 shows a single phase from the unrolled strip of conductors in FIG. 22.

4) The two copper connector strip pieces 1353*a* and 1353*b* are slid onto iron tube 1352 and held in alignment with the iron tube so as to form the pattern (if unrolled) shown in FIG. 22.

5) Holes 1356 and 1358 are created by drilling through both iron tube 1352 and copper connector strip pieces 1353*a* and 1353*b* as they are held in alignment.

6) Solder is applied to connect each hole 1356 to each hole 1358 that correspond as shown in FIG. 22, forming 3 phases 1364*a*, 1364*b*, and 1364*c* as denoted in FIG. 22.

Figure 24:
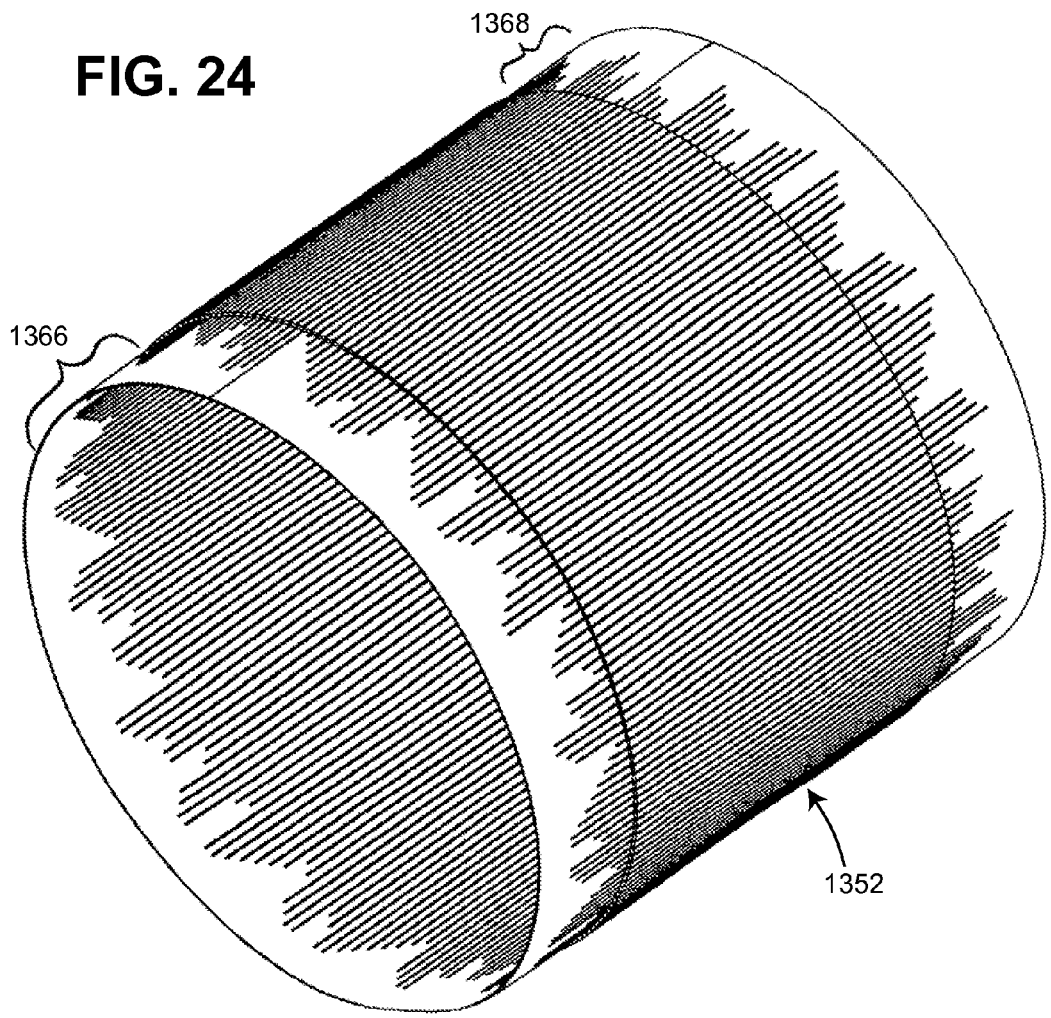
FIG. 24 shows a tubular component of the windings of the electric actuator of FIG. 19.

After the armature is assembled, it is then possible to assemble it into a brushless or brushed motor, as is well known in the prior art. As in the first embodiment, armature 1350 can be layered multiple times to increase the number of turns presented to a magnetic field, thereby increasing the torque output of the motor. To do so without creating an air gap between layers, each tube 1352 is reduced in diameter at the ends before assembly, as shown in FIG. 24, with cuts 1366 and 1368, where the cut depth is greater than the thickness of copper connector strip pieces 1353*a* and 1353*b*, so that after assembly the maximum diameter of a layer of armature 1350 does not exceed the diameter of tube 1352.

Tube 1352 is preferably constructed out of purified iron because it is desirable to maintain a high magnetic flux density through armature 1350, even if multiple layers are used. However, tube 1352 could be made out of a material with a small or negative magnetic susceptibility, such as copper, as opposed to purified iron with its high magnetic susceptibility.

Figure 25:
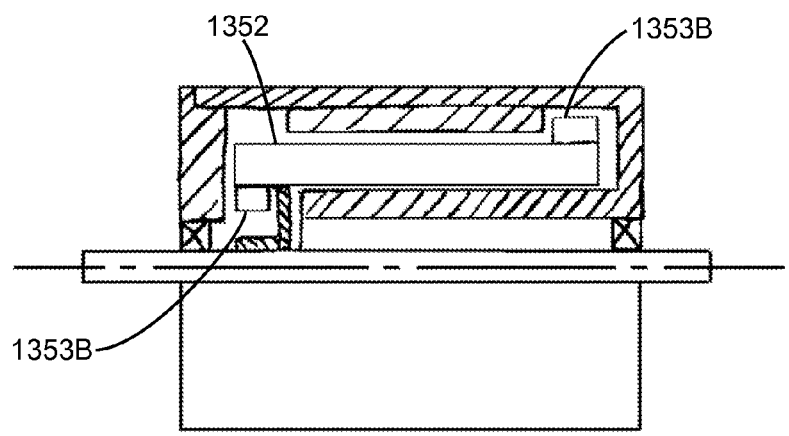
FIG. 25 shows a cross-sectional view of a motor with tubular strips connected at either end by copper connectors of the windings of the electric actuator of FIG. 19.

For assembly reasons, it is also possible when building a single layered armature 1350 to mount one of the two copper connector strip pieces 1353*a* or 1353*b* on the inside of tube 1352. For example, FIG. 25 shows a motor where this construction aids in assembling the motor.

Figure 26:
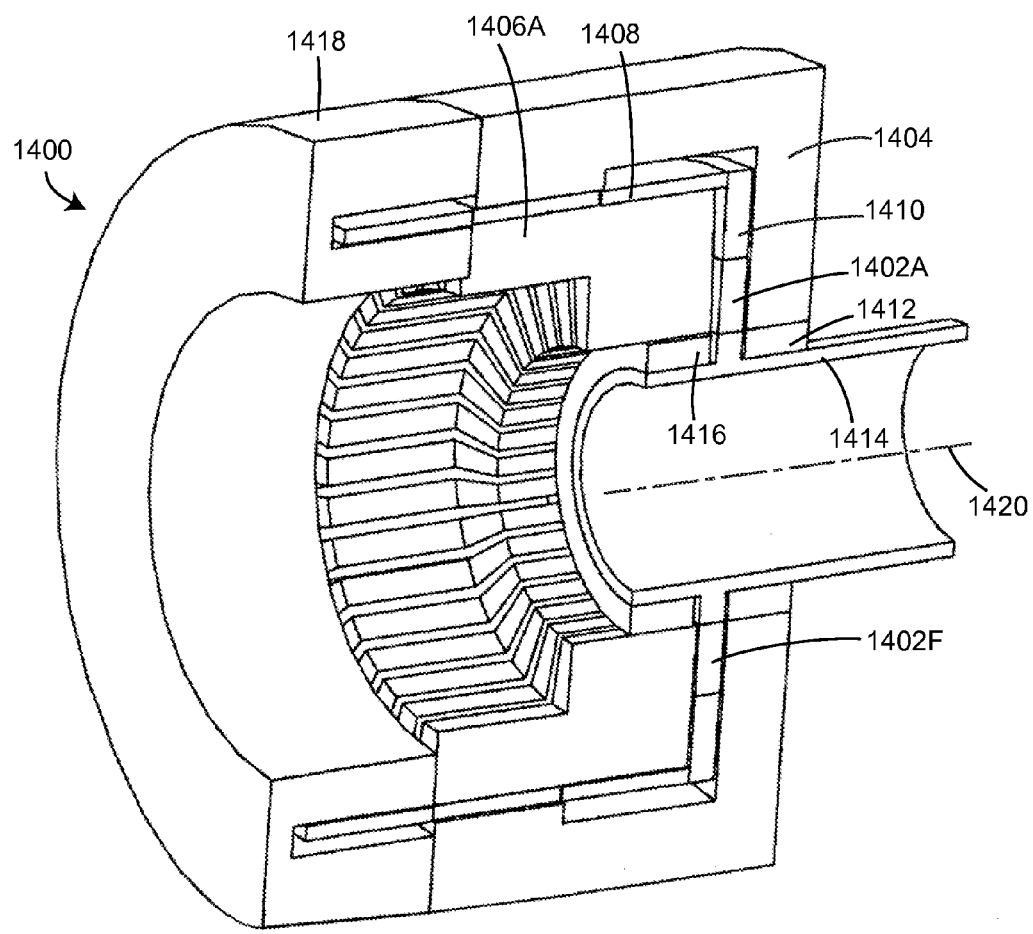
FIG. 26 shows a perspective view of an embodiment.
Figure 27:
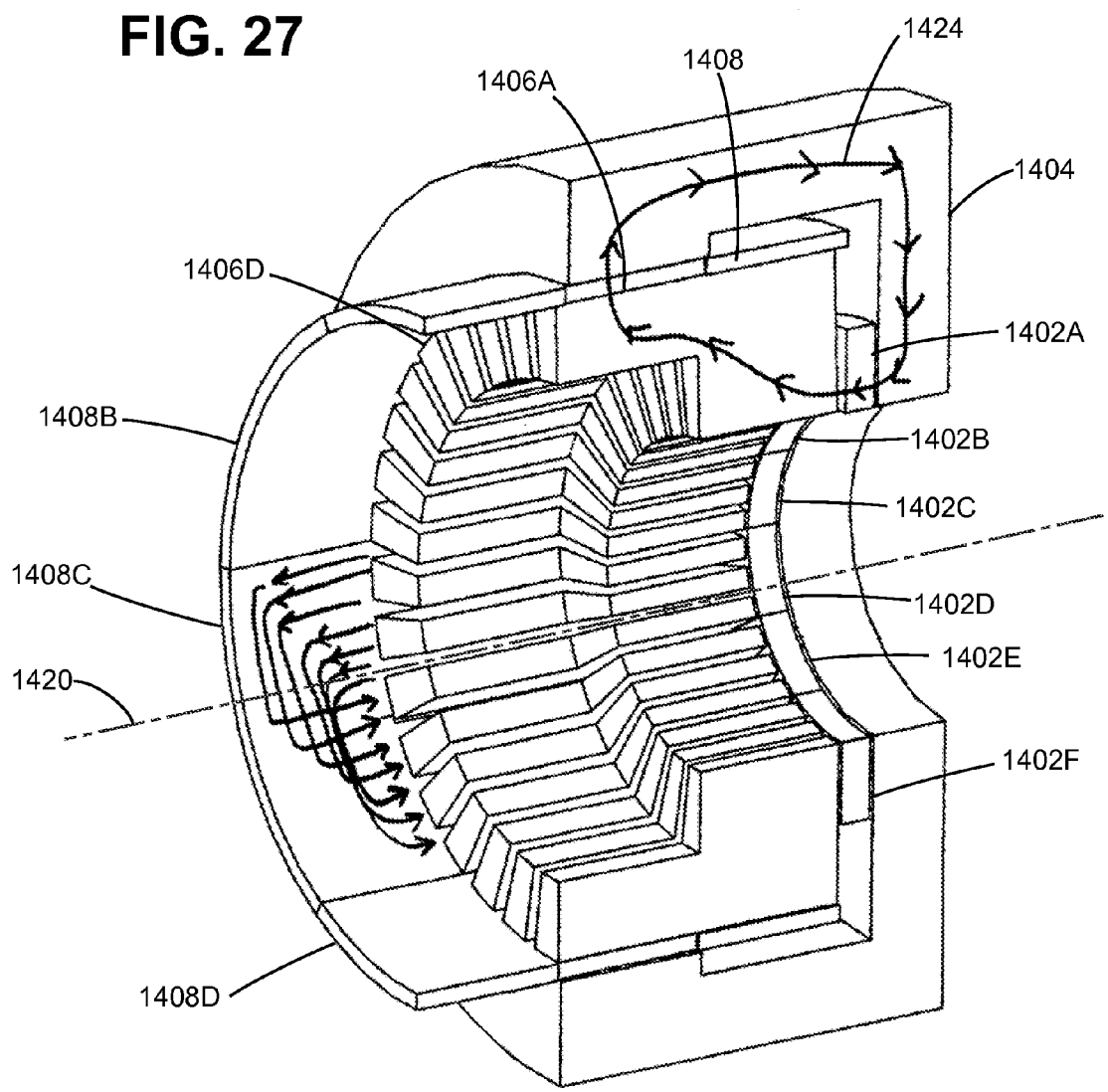
FIG. 27 shows a perspective view of an embodiment.
Figure 28:
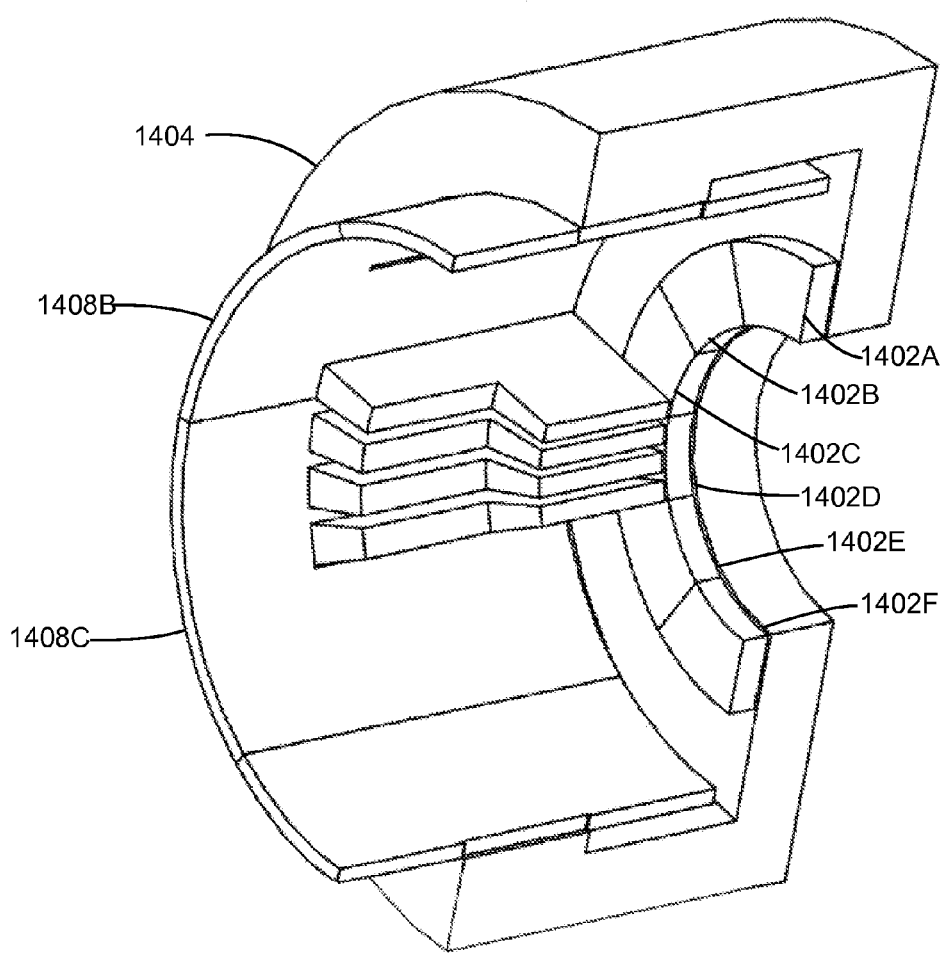
FIG. 28 shows a perspective view of an embodiment.

FIG. 26 shows another embodiment. An electric motor 1400 is magnetically commutated, instead of using the standard mechanical commutation scheme of brushes or the electronic commutation of a brushless motor controller. This embodiment is best understood using a simplified drawing of the key parts as shown in the cross sectional view of FIG. 27. Magnets 1402*a*, 1402*b*, 1402*c*, 1402*d*, and 1402*e* are preferably neodymium-iron-boron magnets that alternate in polarity around a motor axis 1420. Magnetic field line 1424 represents the path the magnetic field takes from magnets 1402. Wire turns 1408 represent wiring wrapped around the circumference of the motor in preferably a wave winding, for example as shown in FIG. 23, so that current flows parallel to axis 1320 in two opposite directions: in direction 1434 or direction 1436, as shown in 23. The current reverses at an angular position which corresponds to the angular position of each arc of magnets 1402a, 1402b, 1402c, and 1402d; for example, radially outward from magnet 1402a, which has a north face facing return leg 1406a, the current flows in direction 1436, while radially outward from magnet 1402b, which has a south face facing return leg 1406d, the current flows in direction 1434. Since magnetic field line 1424 passes through wire turns 1408, which have a current flowing through them, wire turns 1408 experience a force perpendicular to both the magnetic field and the current, in the direction tangent to the diameter of the motor. Wire turns 1408 are held stationary, thereby causing a return 1404 and return legs 1406 to rotate about axis 1420. As each of return legs 1406 crosses the boundary between a north and south pole face at magnet ring 1402, the magnetic field is reversed, which is convenient because the current traveling in wire turns 1408 is traveling the opposite direction it was at the previous pole, thereby resulting in the torque being in the same direction as it was previously. Wire turns 1408 are preferably constructed as in the previous embodiments, with purified iron sections running in directions 1434 and 1436 and connected by copper connectors that run perpendicular to those directions, in order to establish a high permeability path for magnetic field line 1424. Return legs 1406 are preferably made as shown (instead of one piece of material), with air gaps in between solid iron, to discourage field lines from traveling tangentially and shorting the flux from a north pole to an adjacent south pole, instead of having it substantially travel through wire turns 1408.

The purposes of the remaining components shown in FIG. 26 are straightforward. A connector piece 1418 mechanically fixes return 1404 to each of return legs 1406 and is preferably nonmagnetic, for example aluminum. The assembly of return legs 1406 is supported by a bearing 1416, and return 1404 is supported by a bearing 1412, both riding on a tube support 1414, which is fixed. Tube support 1414 is preferably a nonmagnetic material such as aluminum. Wire support 1410 is also preferably nonmagnetic and holds wire turns 1408 fixed.

Figure 29:
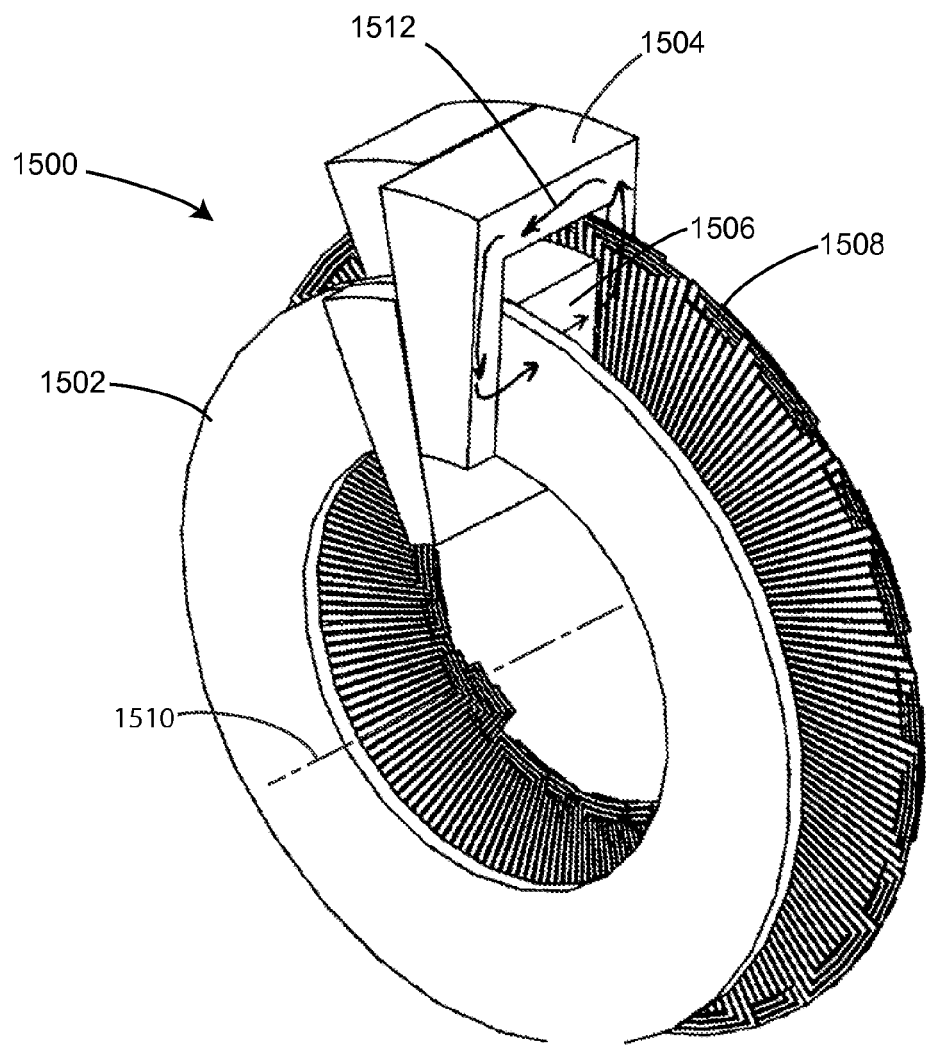
FIG. 29 shows a perspective view of an embodiment.
Figure 30:
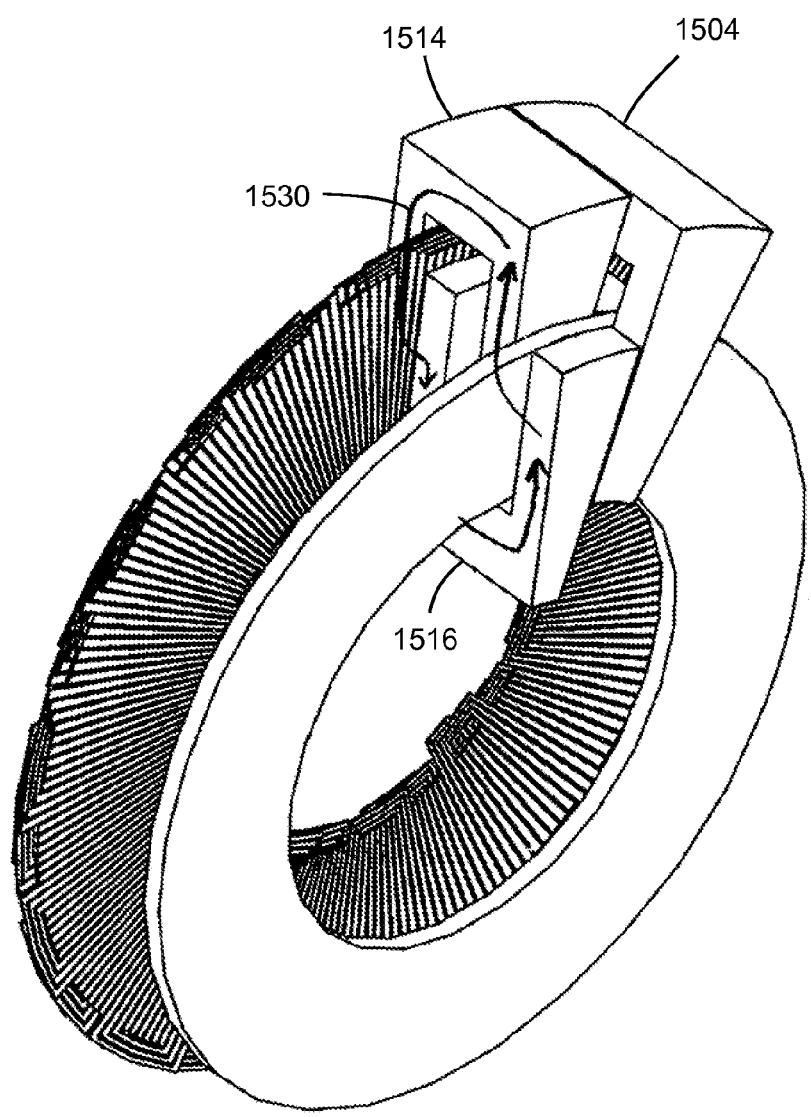
FIG. 30 shows a perspective view of an embodiment.
Figure 31:
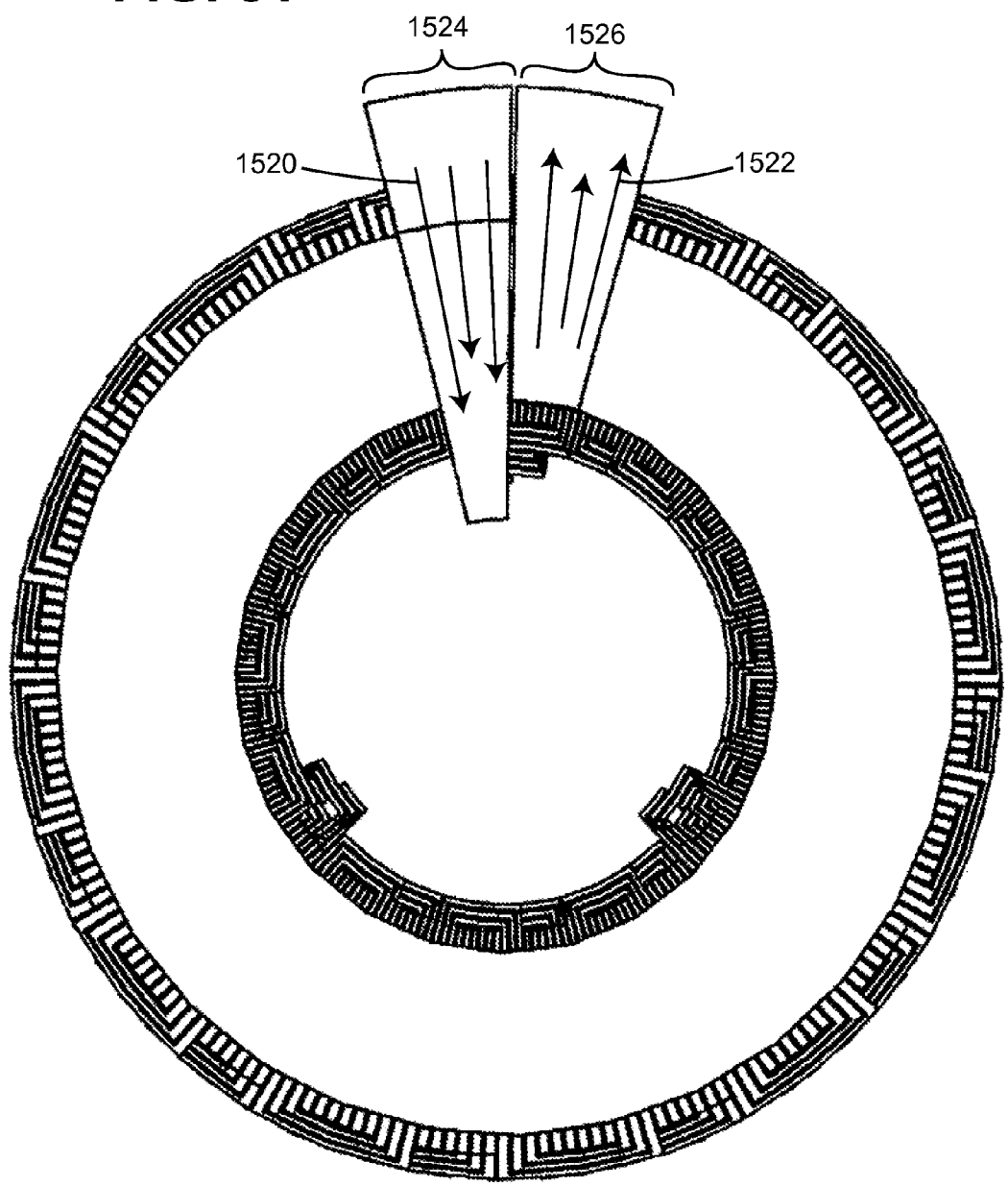
FIG. 31 shows a plan view of an embodiment.
Figure 32:
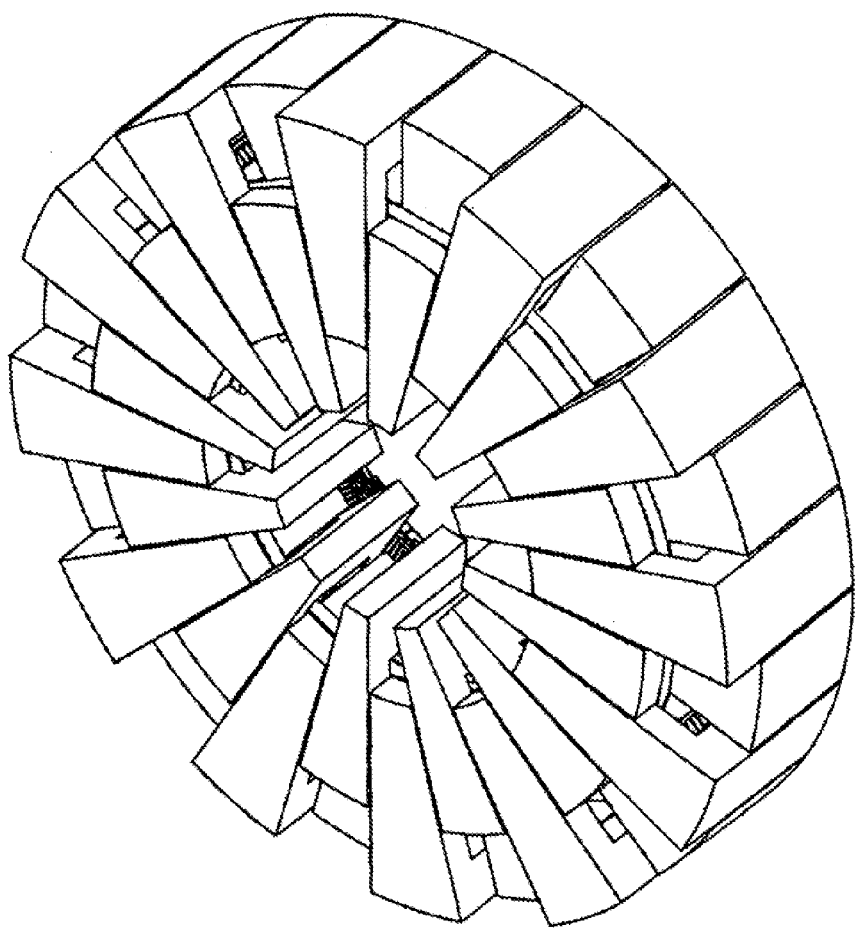
FIG. 32 shows a perspective view of an embodiment.

FIG. 29 shows another embodiment. An electric motor 1500 is magnetically commutated, instead of using the standard mechanical commutation scheme of brushes or the electronic commutation of a brushless motor controller. This embodiment is best understood using a simplified drawing of the key parts as shown in the view of FIG. 29 (note the axes at the bottom left of the page, highly useful in understanding the rest of the drawings). A ring magnet 1502 is magnetized along the direction of an axis 1510 so that the north pole faces a pole face 1506. A magnetic flux line 1512 shows how the magnetic field travels through a return 1504, completing a circuit that is driven by ring magnet 1502 and that has the magnetic field lines passing through a wave winding 1508. Winding 1508 is constructed in the same manner and with the same materials as was 3 phase winding 1313 of the embodiment of FIG. 7, except that all 3 phases are connected in series (forming essentially a single phase). Since winding 1508 has 24 poles, the current flows radially outward in the wires corresponding to the first pole and radially inward in the wires corresponding to an adjacent pole. For example, as shown in FIG. 31, current is flowing radially inwards in the section of winding 1508 corresponding to a subassembly 1524 (which includes return paths 1514 and 1416, as shown in FIG. 30) and radially outward in subassembly 1526 (which includes return 1504 and pole face 1506.) As can be seen by comparing FIG. 30 and FIG. 29 (particularly magnetic field lines 1530 and 1512), the magnetic field is reversed between the two subassemblies 1524 and 1526. It is also clear from FIG. 31 and the description above that current is reversed between the portions of winding 1508 corresponding to subassemblies 1524 and 1526. Since the magnetic field lines 1530 and 1512 cross currents 1520 and 1522, respectively, in winding 1508, a force perpendicular to both results in winding 1508. Winding 1508 is held stationary, thereby resulting in the rotation of ring magnet 1502 about axis 1510 (ring magnet 1502 can rotate about axis 1510). Part 1516, return path 1514, return 1504, pole face 1506, and winding 1508 are held stationary. Preferably, the subassemblies are patterned around the axis of rotation as shown in FIG. 341.

Figure 33:
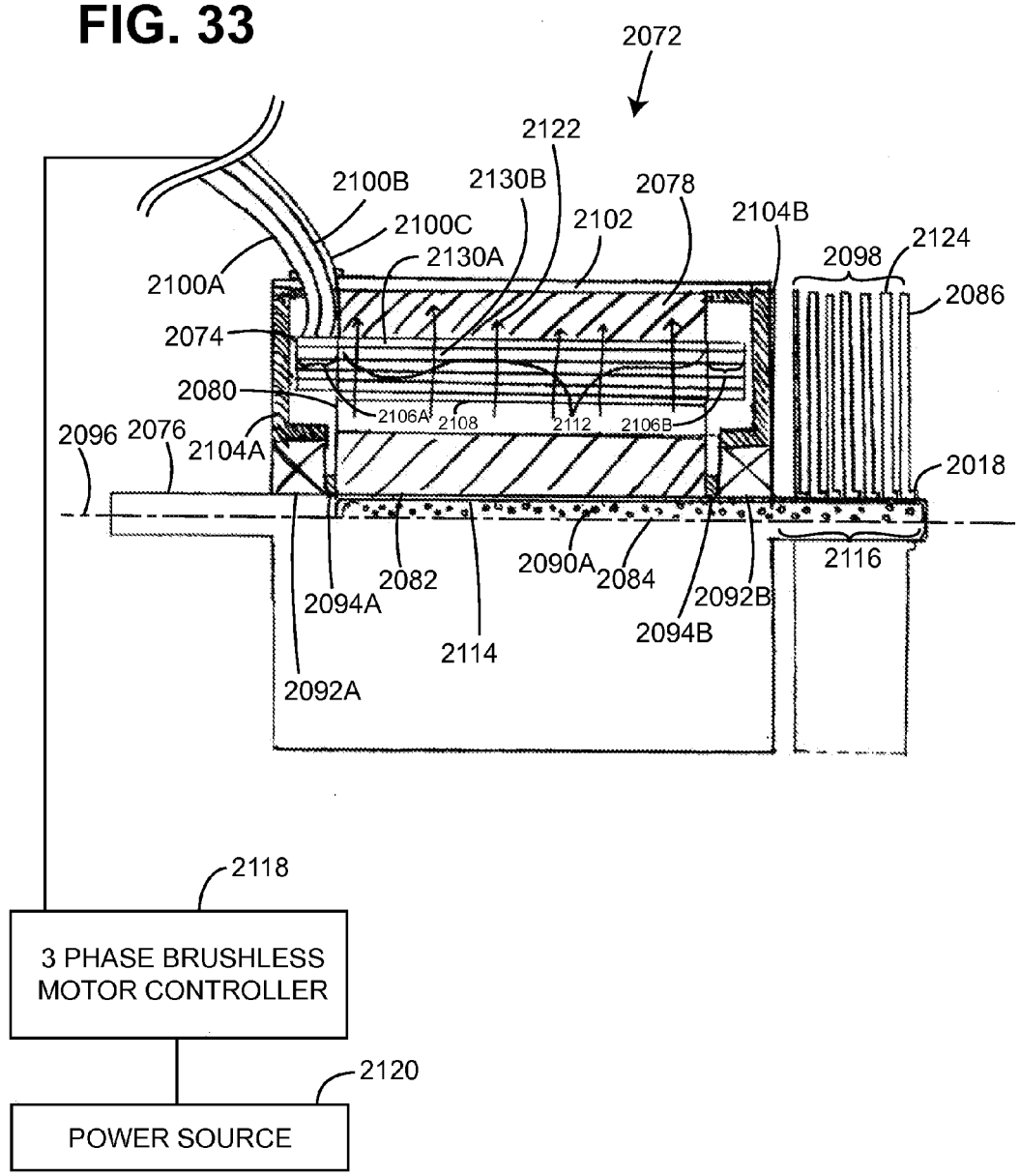
FIG. 33 is a cross-sectional view of an embodiment.

FIG. 33 is a half cross-sectional view that shows an electric motor 2072, the preferred embodiment. Electric motor 2072 has a multilayer winding 2074 which comprises a purified iron section 2112 and copper-connected sections 2106a and 2106b. Purified iron section 2112 is preferably 99.98% pure iron. Magnets 2080 are preferably neodymium-iron-boron magnets of high power, such as a NEOMAX 50 magnets from Sumitomo Specialty Metals. An inner magnetic return 2082 is preferably of a high magnetic saturation flux density material iron-cobalt (CoFe) of 17-50% cobalt, most preferably 48% cobalt. Outer magnetic return 2078 is preferably of the same material. An outer tubular housing 2102 is preferably of an anodized aluminum alloy such as 6061-T6. Bearing supports 2104a and 2104b are preferably also 6061-T6 aluminum. Ball bearings 2092a and 2092b are preferably stainless steel teflon-sealed ball bearings. Spacers 2094a and 2094b serve to separate ball bearings 2092a and 2092b from an inner magnetic return 2082. A combination shaft/heatpipe 2076 is preferably copper and has an evacuated vapor chamber 2084 with grooved inner walls 2114 for returning by a capillary action condensation of water vapor 2090, which carries heat from inner magnetic return 2082 to a cooler region 2116 of combination shaft/heatpipe 2076. Cooling fins 2098 form a spiral about an axis 2086 which is also the axis of combination shaft/heatpipe 2076. Wires 2100a, 2100b, and 2100c connect multilayer winding 2074 to a 3-phase brushless motor controller 2118, which receives power from a power source 2120. Magnetic field 2122 is created by magnets 2080.

Magnets 2080 are fixed to inner magnetic return 2082, which is fixed to combination shaft/heatpipe 2076. Combination shaft/heatpipe 2076 has cooling fins 2098 fixed to it. Combination shaft/heatpipe 2076 is rotably mounted to bearing supports 2104a and 2104b by ball bearings 2092a an 2092b. Bearing supports 2104a and 2104b are fixed to outer tubular housing 2102. Outer magnetic return 2078 is fixed to tubular housing 2102. Multilayer winding 2074 is fixed to outer magnetic return 2078.

Electric motor 2072 operates as follows: 3 phase brushless motor controller 2118 switches the 3 phase windings of multilayer winding 2074, just as in a typical 3 phase brushless motor. Magnets 2080 establishes a magnetic field 2122 which travels in loops, up at the section shown, into the page, down through an adjacent pole of multiplayer winding 2074, and out of the page to connect at the tails of the arrows shown (the loop described is just the same as loop 2504 in FIG. 34 except that it extends through multilayer winding 2074 and outer return 2078). When current is applied to the conductors of multilayer winding 2074 that are crossed by magnetic field 2122, Lorentz forces occur into the page such that multilayer winding 2074 experiences a torque about axis 2096. An opposite reaction torque causes magnets 2080, inner return 2082, and combination shaft/heatpipe 2076 to rotate if housing 2102 is held stationary (which is preferable in this embodiment).

The resistive losses and other losses of motor 2072 generate heat. Magnets 2080 are susceptible to damage by heat. Combination shaft/heatpipe 2076 helps remove heat from magnets 2082 by transferring the heat arriving through inner magnetic return 2082 to cooling fins 2098 by action of water vapor 2090 traveling to the right of chamber 2084, then returning along grooves in the grooved inner walls 2114 of chamber 2084 designed to support capillary action. Cooling fins 2098 rotate with combination shaft/heatpipe 2076, which because they form a spiral and are rotating, agitate the air 2124 and enhance convection of heat to air 2124.

Advantageously, electric motor 2072 may generate a high torque because of two reasons in particular. First, magnetic field 2122 may be stronger than in other motors because magnetic field 2122 travels in a lower reluctance path. Since inner magnetic return 2082, outer magnetic return 2078, and purified iron section 2112 of multilayer winding 2074 all comprise materials with a high magnetic permeability, and since only a single air gap 2108 exists because outer magnetic return 2078 is fixed directly to multilayer winding 2074, magnetic field 2122 can be maintained at a high level, preferably over 1.2 T. Secondly, because purified iron section 2112 of multilayer winding 2074 is a low reluctance path, instead of the normal copper wires or other high reluctance construction, magnetic field 2122 can maintain its strength over a much larger distance while passing through multilayer winding 2074. Therefore, many more layers of conductor can be exposed to magnetic field 2122, and each can produce torque. So, whereas a conventional motor may have 1 or 2 layers of conductor generating Lorentz forces, a motor built according to the present embodiments may have more. For example, the preferred embodiment shown in FIG. 33 has 5 layers of conductors. Because each layer of multilayer winding consists of conductors that must be separated from the other layers to prevent inter-layer shorting, it is necessary to introduce a thin insulator 2110 between layers. It is preferable to keep thin insulator 2110 as thin as possible while maintaining sufficient electrical insulation between layers, because most materials at the present time that can be used for thin insulator 2110 also have a low magnetic permeability and a low saturation flux density, effectively acting like tiny air gaps, thereby limiting the practical number of layers in multilayer winding 2074. The preferred material for thin insulator 2110 is lacquer less than 0.001 inches thick, preferably about 0.0003 inches thick, because of cost and availability at the present time. Alternatively, thin insulator 2110 can be made of a ferrite or ferri-magnetic material which offers high electrical resistance, high magnetic permeability, and preferably a high magnetic flux saturation density, thereby reducing the reluctance of the magnetic circuit.

Figure 34:
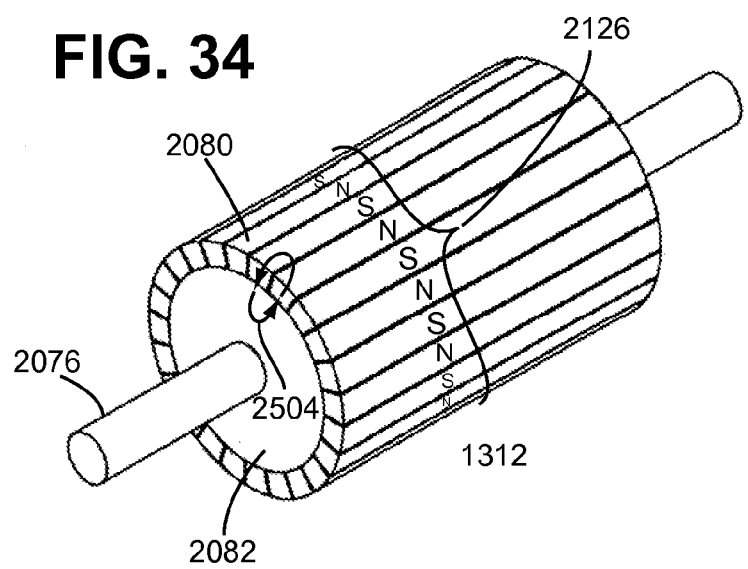
FIG. 34 shows the rotor of the electric actuator shown in FIG. 33.

FIG. 34 shows the details of a rotor 2128 of electric motor 2072, which comprises combination shaft/heatpipe 2076, inner magnetic return 2082, and magnets 2080. Lettering 2126 indicates the north (N) and south (S) poles of magnets 2080, showing that the poles alternate around the circumference of rotor 2128. In the preferred embodiment shown, there are 24 magnets comprising magnets 2080, corresponding to 24 poles of electric motor 2072.

Figure 35:
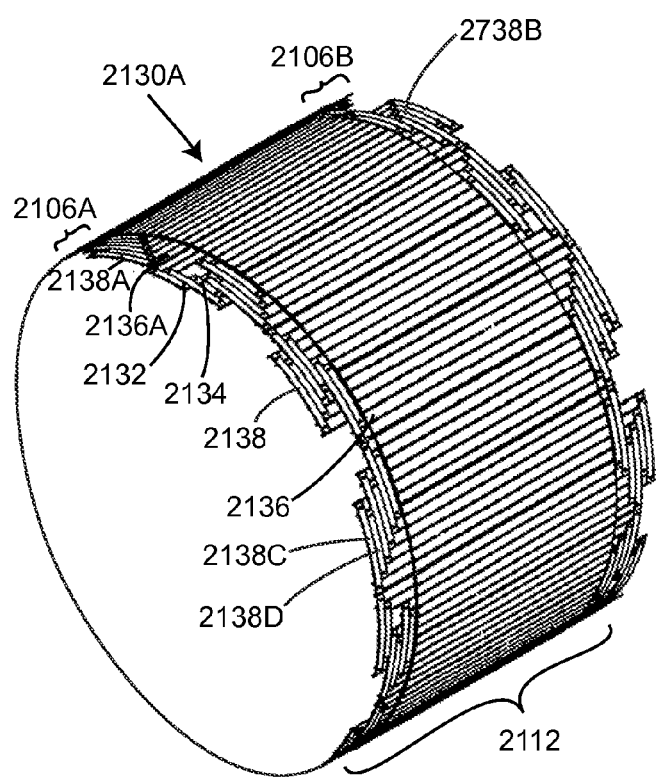
FIG. 35 shows a layer of the stator windings of the electric actuator shown in FIG. 33.

FIG. 35 shows the preferred construction of an outermost layer 2130a of multilayer winding 2074. Outermost layer 2130a is a 24 pole motor winding consisting of 3 phases, each phase having 2 turns of conductor. Outermost layer 2130a connects to wire 2100a at connecting strip 2132. Copper connecting strip 2134 connects to the next layer of multilayer winding 2074. Each copper connecting strip 2134 drawn separately is separated by a layer of lacquer so as not short out each other. For example, copper connecting strips 2138c and 2138d are separate conductor paths and the line between them represents a layer of lacquer that electrically isolates the two from one another.

Figure 36:
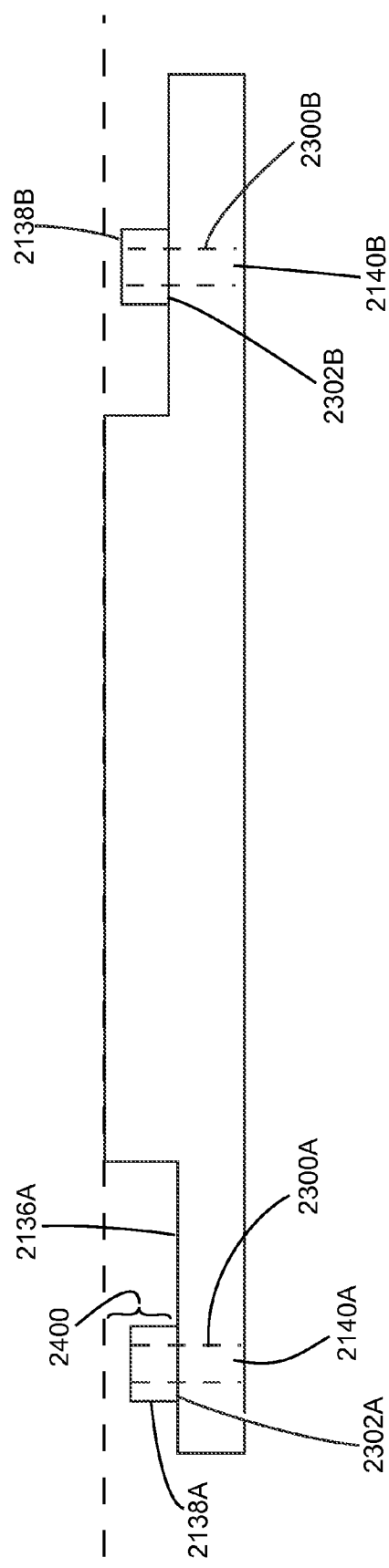
FIG. 36 is a cross-sectional view of a layer of the stator windings of the electric actuator shown in FIG. 33.

Purified iron section 2112 comprises purified iron strips 2136 connected by copper connecting strips 2138. FIG. 36 shows one of the purified iron strips, a purified iron strip 2136a, is connected to two other purified iron strips by means of copper strips 2138a and 2138b. High temperature solder 2140a and 2140b secure copper strips 2138a and 2138b to purified iron strip 2136a. The walls of holes 2300a and 2300b and surfaces 2302a and 2302b that connects purified iron strip 2136a and copper strips 2138a and 2138b are bare of any insulation to allow a good electrical connection between purified iron strip 2136a and copper strips 2138a and 2138b where they connect, but the rest of purified iron strip 2136a and copper strips 2138a and 2138b is electrically insulated preferably by a thin layer of lacquer; this prevents, for example, copper strips 2138 from shorting adjacent purified iron strips 2136; it also prevents adjacent layers of multilayer winding 2074 from shorting to each other. Notably, step-down 2400 on either side of purified iron strip 2136a provides space for copper strips 2138a and 2138b, so that other layers can fit above and below.

Figure 37:
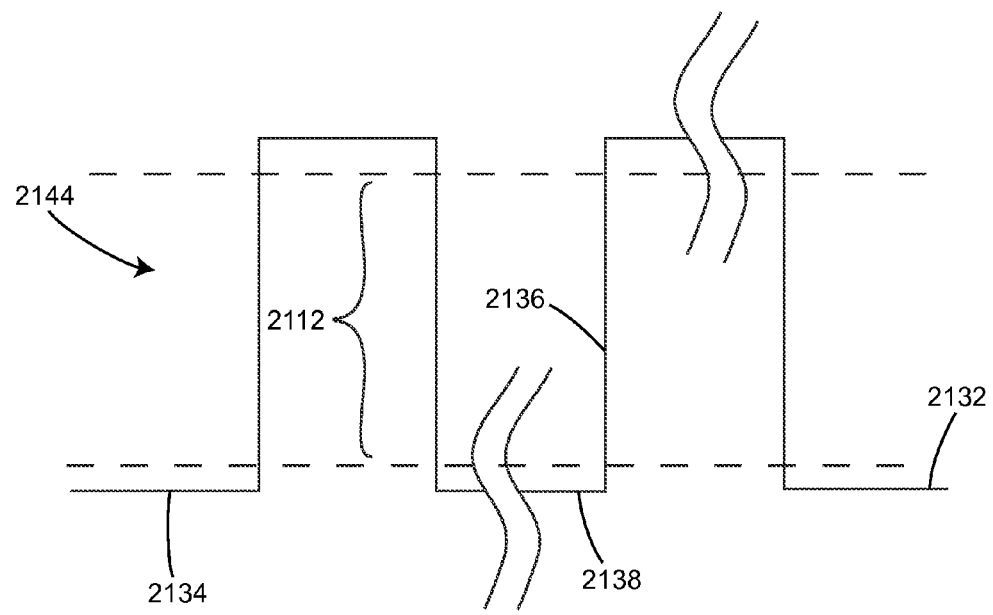
FIG. 37 is a diagram view of a section of the windings of the embodiment shown in FIG. 33.

FIG. 37 shows schematically how connecting strip 2134 connects to connecting strip 2132 by way of making multiple passes up and down within purified iron section 2112 of outer layer 2130a. High magnetic permeability purified iron strips 2136 are connected with low magnetic permeability copper strips 2138, thereby preventing magnetic field lines 2122 from shorting out between adjacent poles of magnets 2080.

Figure 38:
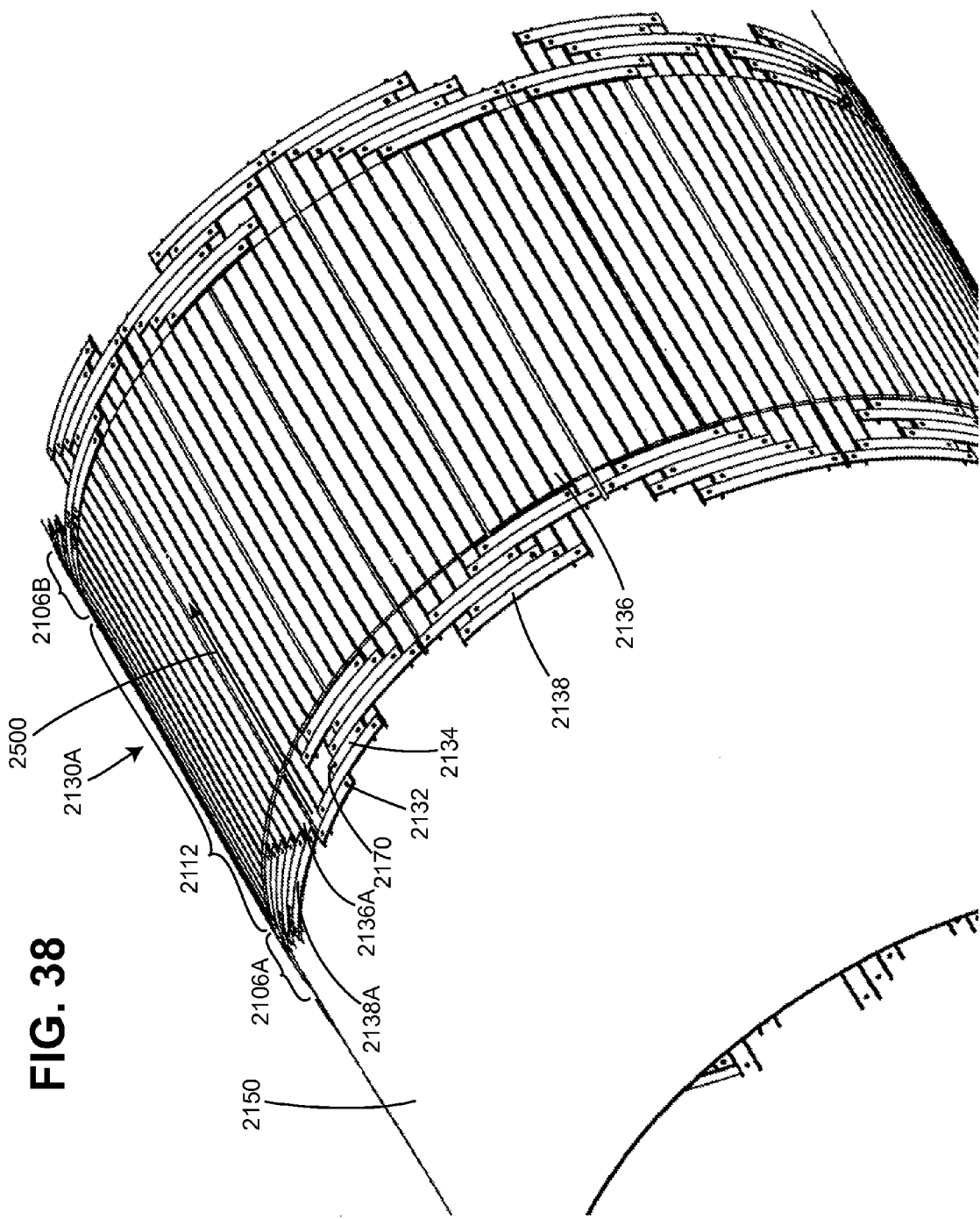
FIG. 38 is a perspective view of a layer of winding from the embodiment shown in FIG. 33.

FIG. 38 shows outermost layer 2130a while it still has a keeper 2150 attached to it during manufacturing. Outermost layer 2130a starts out as a purified iron tube which is cut with slots. Keeper 2150 is the section of tube used to support all of the purified iron strips 2136 during assembly.

Figure 39:
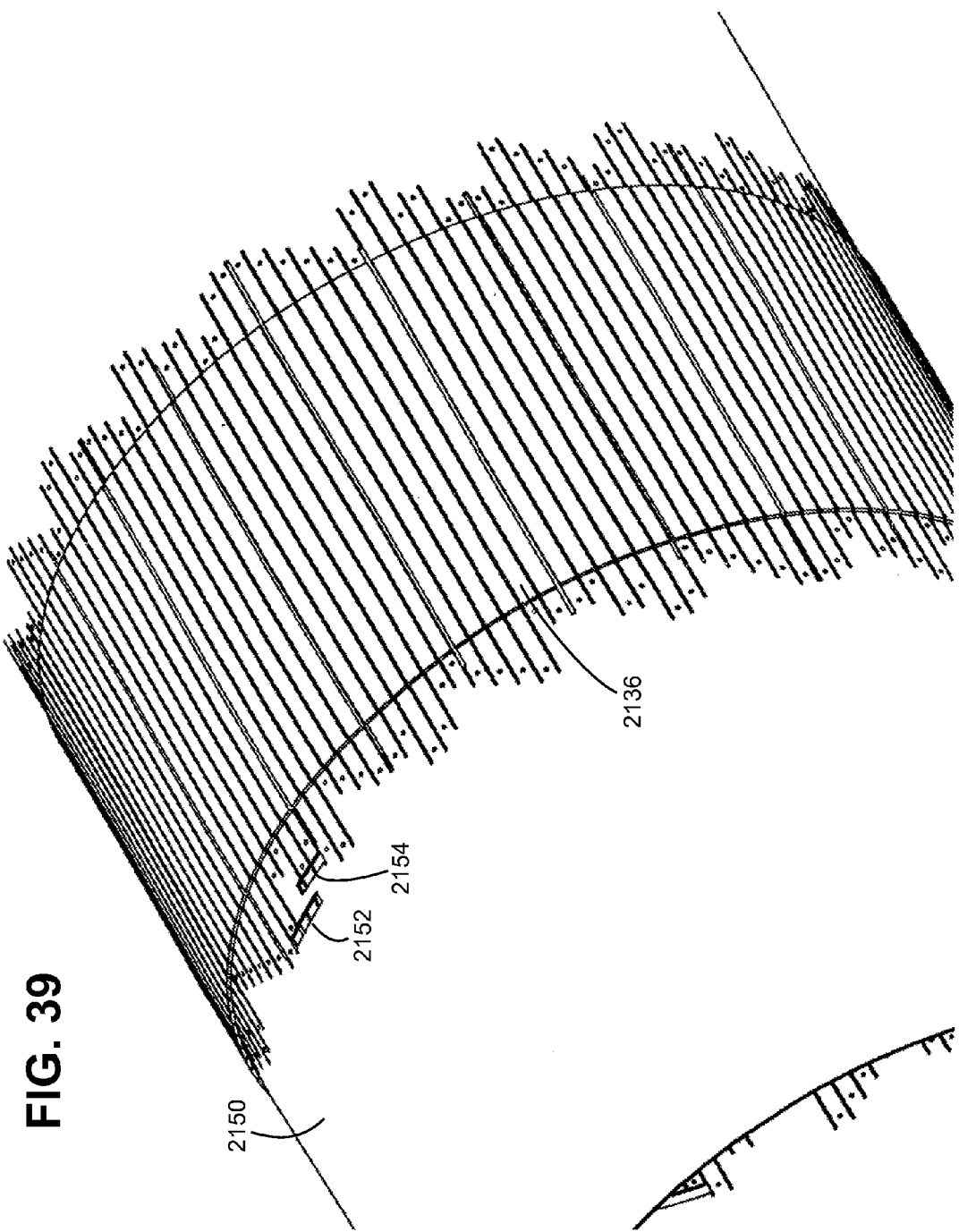
FIG. 39 is a perspective view of a layer of winding from the embodiment shown in FIG. 33.
Figure 40:
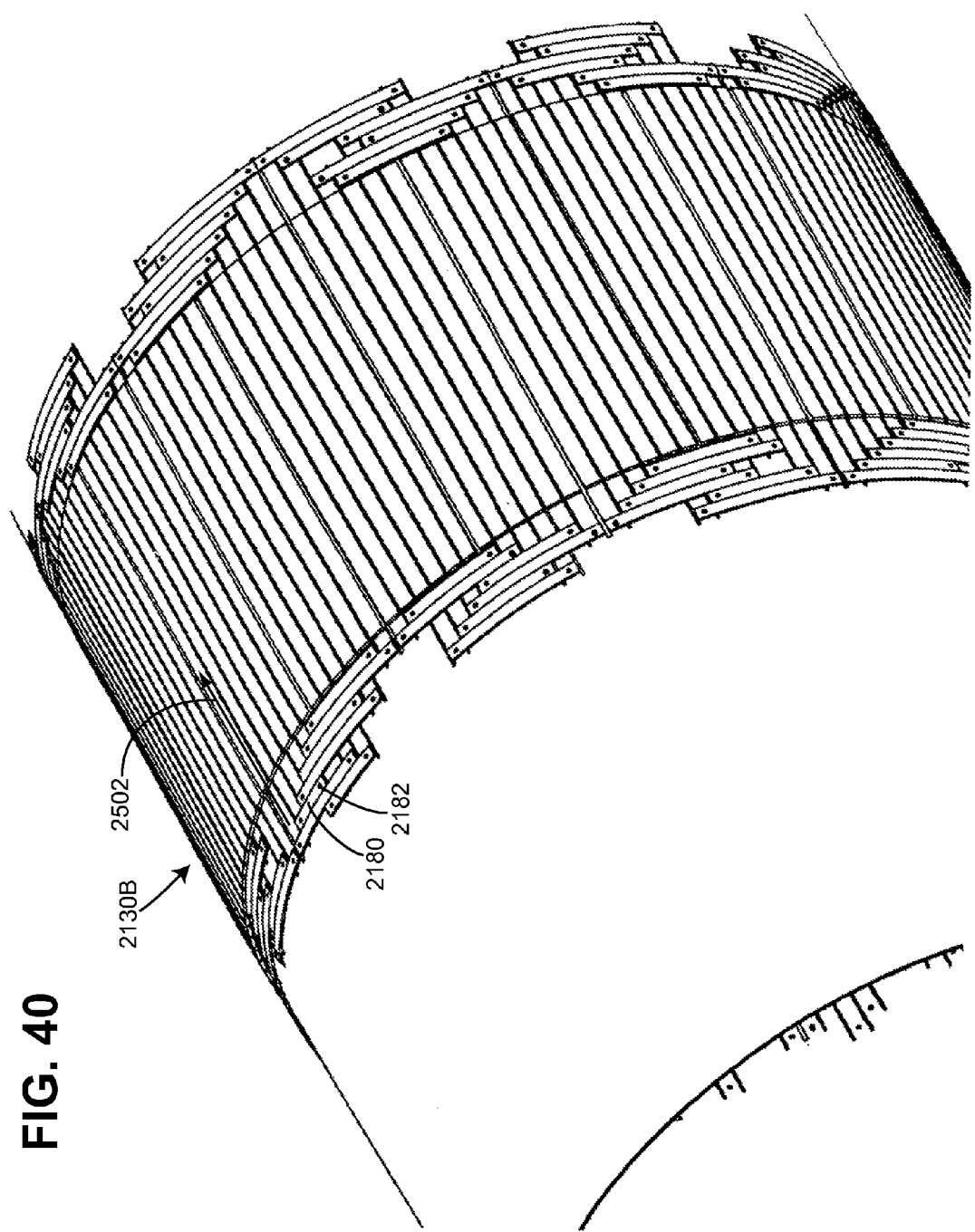
FIG. 40 is a perspective view of a layer of winding from the embodiment shown in FIG. 33.

FIG. 39 shows just the purified iron strips 2136 held together with keeper 2150 but without copper connector strips 2138 installed yet. Openings 2152 and 2154 make it easy to connect layers together. For example, copper connector strip 2134 on outermost layer 2130a fits through opening 2154 to connect with the next layer, a second layer 2130b, as shown in FIG. 430. A hole 2170 of copper connecting strip 2134 connects to a hole 2182 of a copper connecting strip 2180 of second layer 2130b by means of high temperature solder. Second layer 2130b is made such that although a current 2502 is flowing in the opposite circumferential direction as a current 2500 in outermost layer 2130a, the two currents are flowing in the same direction along axis 2096 at the same angular location, corresponding to the same pole on rotor 2128, thereby creating a Lorentz force in the same direction.

Figure 41:
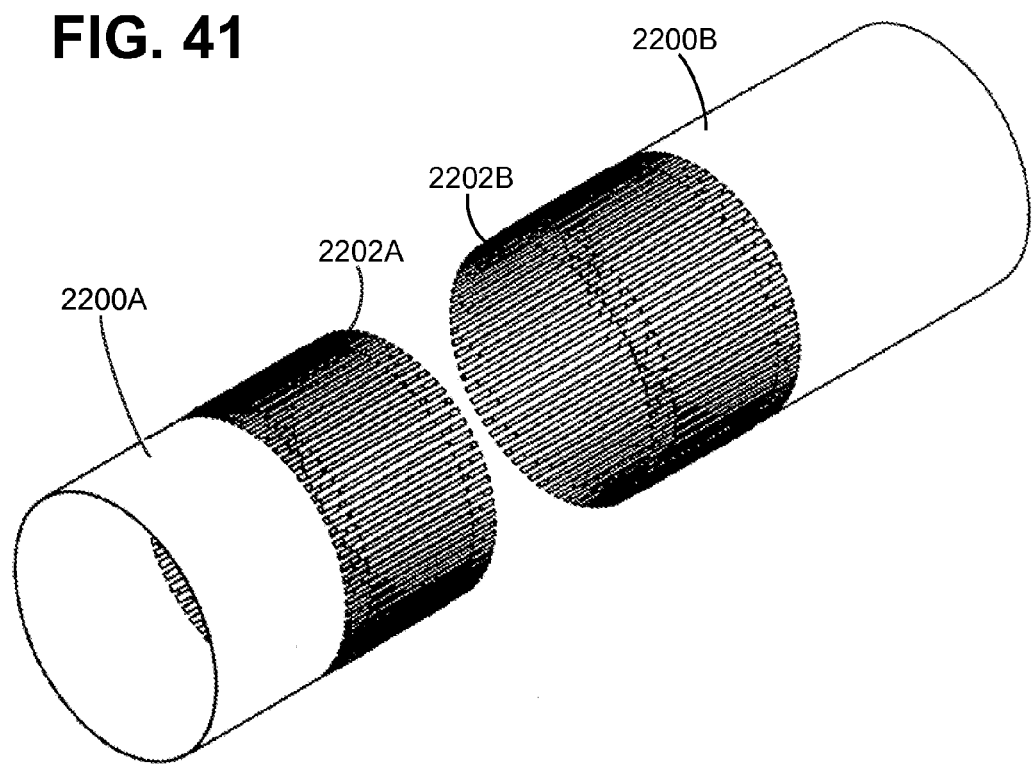
FIG. 41 is a perspective view showing the mating of two halves of tubular winding components of the electric actuator shown in FIG. 33.
Figure 42:
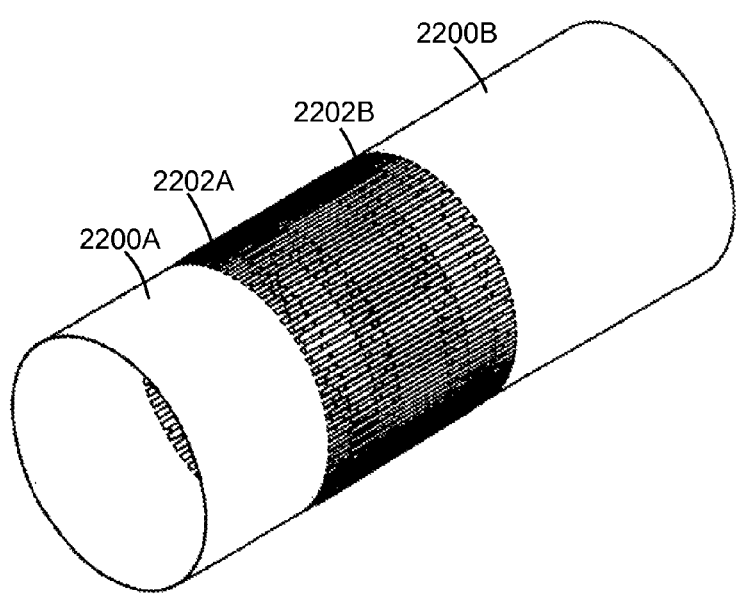
FIG. 42 is a perspective view showing the mating of two halves of tubular winding components of the motor shown in FIG. 33.
Figure 43:
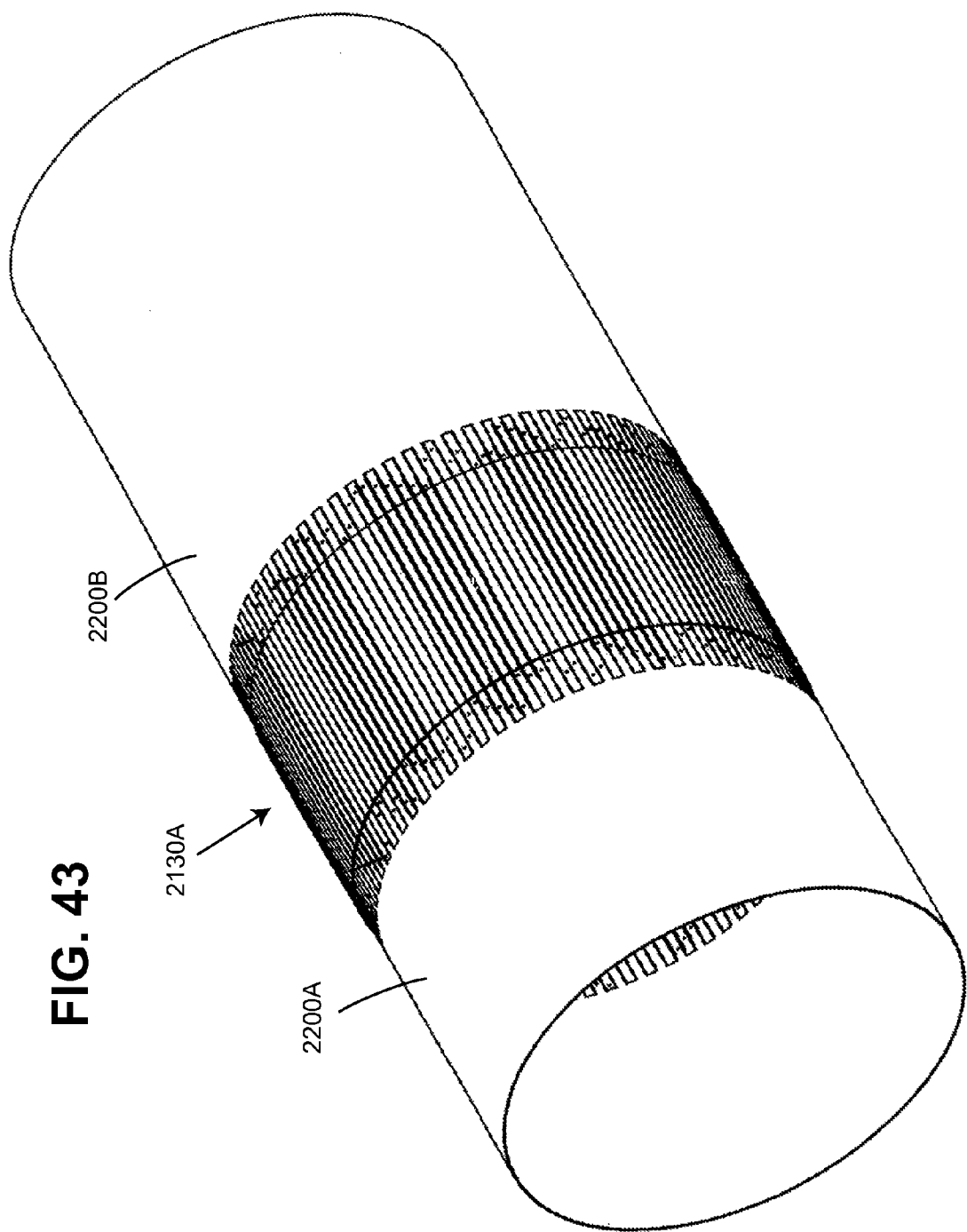
FIG. 43 is a perspective view showing the mating of two halves of tubular winding components of the electric actuator shown in FIG. 33.
Figure 44:
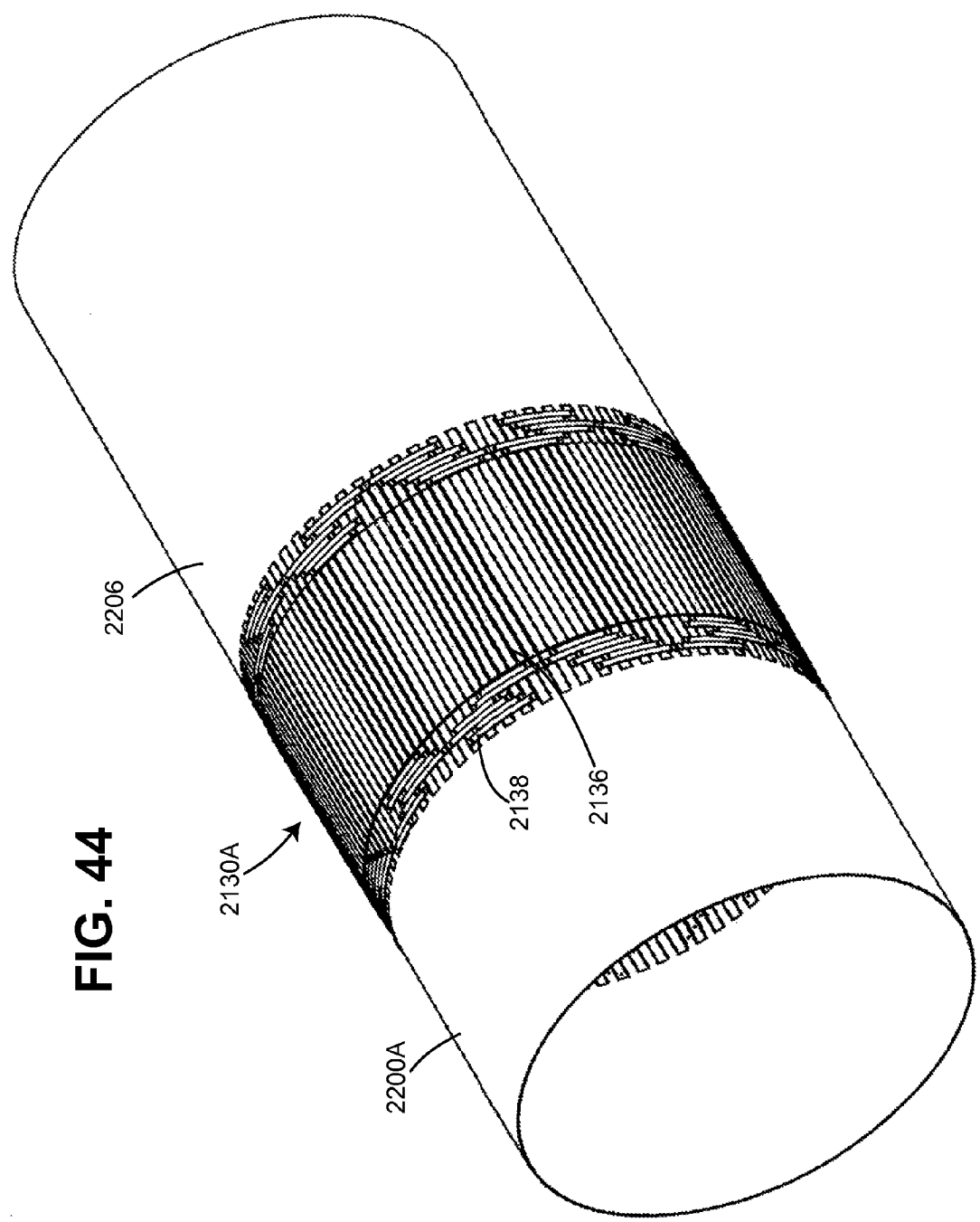
FIG. 44 is a perspective view showing the mating of two halves of tubular winding components of the electric actuator shown in FIG. 33 with components of each phase connected.
Figure 45:
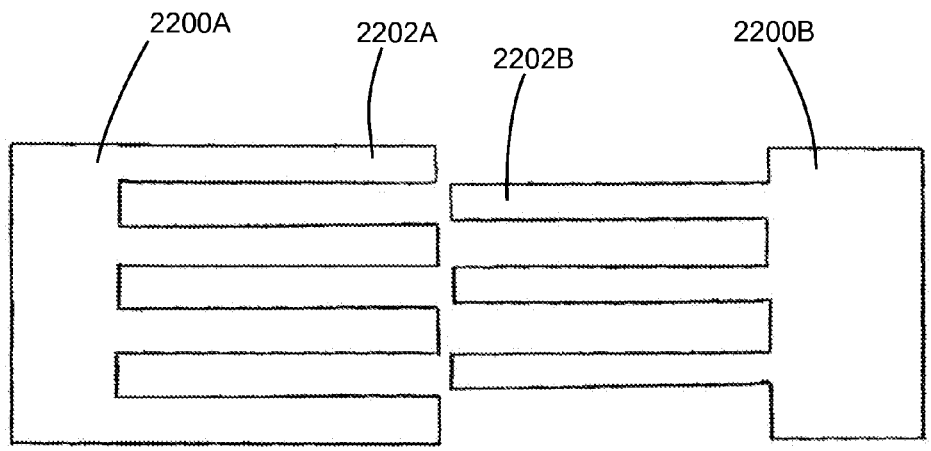
FIG. 45 is a perspective view showing the mating of two halves of tubular winding components of the electric actuator shown in FIG. 33.
Figure 46:
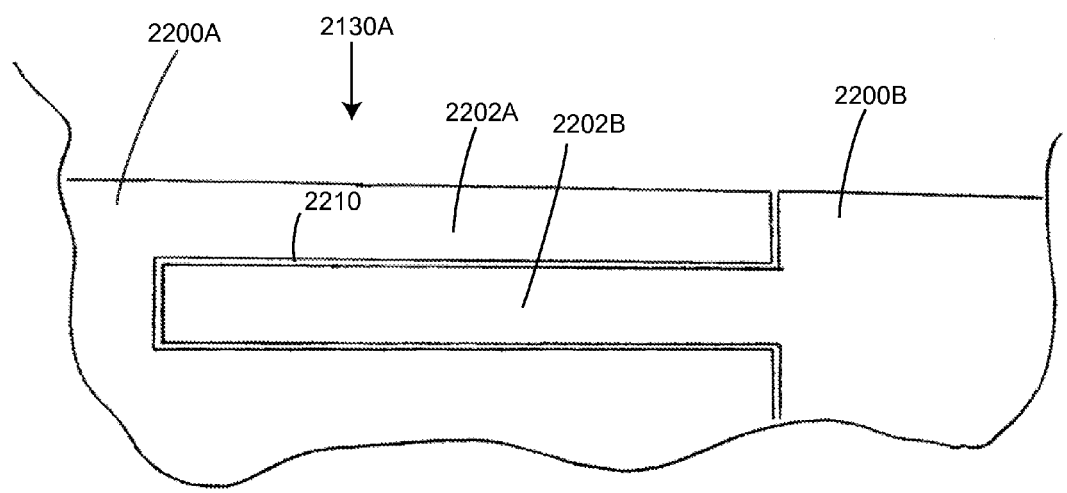
FIG. 46 is a perspective view showing the mating of two halves of tubular winding components of the electric actuator shown in FIG. 33.

FIG. 41 shows an alternate construction (not preferred) of outermost layer 2130a. Although more complicated, it may offer a lower cogging torque for electric motor 2072. Outermost layer 2130a is assembled from two halves, 2200a and 2200b. Half of purified iron strips 2136 comprising purified iron strip set 2202a are on first-half 2200a and half of purified iron strips 2136, comprising purified iron strip set 2202b are on second-half 2200b. Halves 2202a and 2200b are shown coming together, interstitially fitting, in FIG. 42 and finally fully together in FIG. 43, where purified iron strip sets 2202a and 2200b form outer layer 2130a. In FIG. 44, copper connector strips 2138 are added. As can be seen in simplified view FIG. 45 and FIG. 46, when purified iron strip sets 2202a and 2202b come together, they form a very small separation gap 2210, preferably less than 0.005 inches. Very small separation gap 2210 is filled with an electrical insulator. Preferably, purified iron strip sets 2202a and 2202b are coated with lacquer prior to assembly to create the electrical insulation between purified iron strips 2136. Because of the very small size of very small separation gap 2210, 2130a in this alternate embodiment is almost an iron tube, in effect, such that magnets 2080 "see" little difference as rotor 2128 is rotated because of the lack of discrete high and low reluctance positions (assuming each of the 5 layers of multilayer winding 2074 is built the same way as 2130a).

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

For example, although the preferred embodiment discussed was an electric actuator of a specific form (i.e., an electric motor), the invention can be applied to other forms of electric actuators, such as linear motors, solenoids, voice coils, and speakers. The invention can be used in reverse, to generate power from an input force, just as a motor can be used as a generator or alternator. Thus, it can be used as sensor in addition to being an actuator. The present embodiments are illustrative and not restrictive of the invention; the appended claims rather than the presented descriptions and embodiments indicate the full scope of the invention.

What is claimed:

1. A machine for generating force or torque, comprising:
    a magnetic field;
    a conductor having a relative magnetic permeability of greater than 1 and covered by a layer of an electrical insulator having an electrical resistance of greater than 1 ohm-meter, wherein the conductor is carrying an electric current and the magnetic field intersects the electric current.

2. A method of generating torque in an electric actuator, comprising the steps of:
    a) providing a conductor having a relative magnetic permeability of greater than 1 and covered by a layer of an electrical insulator having an electrical resistance of greater than 1 ohm-meter,
    b) providing a magnetic field,
    c) providing a return path,
    d) generating an electric current within the conductor, wherein the magnetic field intersects the electric current, whereby said electric current causes movement of said conductor relative to said return path.

3. The machine for generating force or torque of claim 1, wherein said conductor has a relative magnetic permeability greater than 100.

4. The method of claim 2 wherein said conductor has a relative magnetic permeability greater than 100.

5. The machine of claim 1, wherein the conductor has a relative magnetic permeability greater than 1000, whereby the conductor has a relative magnetic permeability of approximately the same order of magnitude as purified iron.

6. The machine of claim 3, wherein the conductor has a magnetic saturation flux density of greater than 1 Tesla.

7. The machine of claim 6, further comprising a power source.

8. The machine of claim 7, wherein the magnetic field is generated by a magnet.

9. The machine of claim 8, wherein the magnet is selected from the group consisting of permanent magnets, electromagnets, and superconducting electromagnets.

10. The method of claim 2 wherein the conductor has a relative magnetic permeability greater than 1000, whereby the conductor has a relative magnetic permeability of approximately the same order of magnitude as purified iron.

11. The method of claim 4, wherein the conductor has a magnetic saturation flux density of greater than 1 Tesla.

\* \* \* \* \*